US012666501B2

(12) United States Patent (10) Patent No.: US 12,666,501 B2

Ben-Yehezkel et al. (45) Date of Patent: Jun. 23, 2026

(54) METHODS AND APPARATUS TO OPPORTUNISTICALLY OPERATE A WLAN INTERFACE USING SHARED RESOURCES

(71) Applicant: Texas Instruments Incorporated, Dallas, TX (US)

(72) Inventors: Yoav Ben-Yehezkel, Netanya (IL); Yaron Alpert, Hod-Hasharon (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 550 days.

(21) Appl. No.: 18/072,577

(22) Filed: Nov. 30, 2022

(65) Prior Publication Data

US 2024/0179804 A1 May 30, 2024

Related U.S. Application Data

(60) Provisional application No. 63/345,566, filed on May 25, 2022.

(51) Int. Cl.
H04W 88/06 (2009.01)
H04W 84/12 (2009.01)

(52) U.S. Cl.
CPC ........... H04W 84/12 (2013.01); H04W 88/06 (2013.01)

(58) Field of Classification Search
CPC ............................... H04W 84/12; H04W 88/06

USPC ......................................................... 370/338
See application file for complete search history.

(56) References Cited

U.S. PATENT DOCUMENTS

2021/0297949 A1* 9/2021 Liu ...................... H04W 56/001
2021/0352589 A1 11/2021 Kencharla et al.

* cited by examiner

*Primary Examiner* — Huy C Ho
(74) *Attorney, Agent, or Firm* — Michelle F. Murray; Frank D. Cimino

(57) ABSTRACT

An example apparatus includes: wireless local area network (WLAN) interface circuitry configured to communicate using a resource; alternate interface circuitry configured to use the resource; and coexistence controller circuitry coupled to the WLAN interface circuitry and the alternate interface circuitry, the coexistence controller circuitry including: a first interface monitor coupled to the WLAN interface circuitry, the first interface monitor configured to determine characteristics of a target wakeup time (TWT) service of the WLAN interface circuitry; a second interface monitor coupled to the alternate interface circuitry, the second interface monitor configured to determine characteristics of an alternate activity period window of the alternative interface circuitry; a coexistence comparator coupled to the first interface monitor and the second interface monitor, the coexistence comparator configured to determine a predicted TWT service period of the TWT service that overlaps with a predicted alternate activity period window less than a threshold.

22 Claims, 12 Drawing Sheets

100

1000

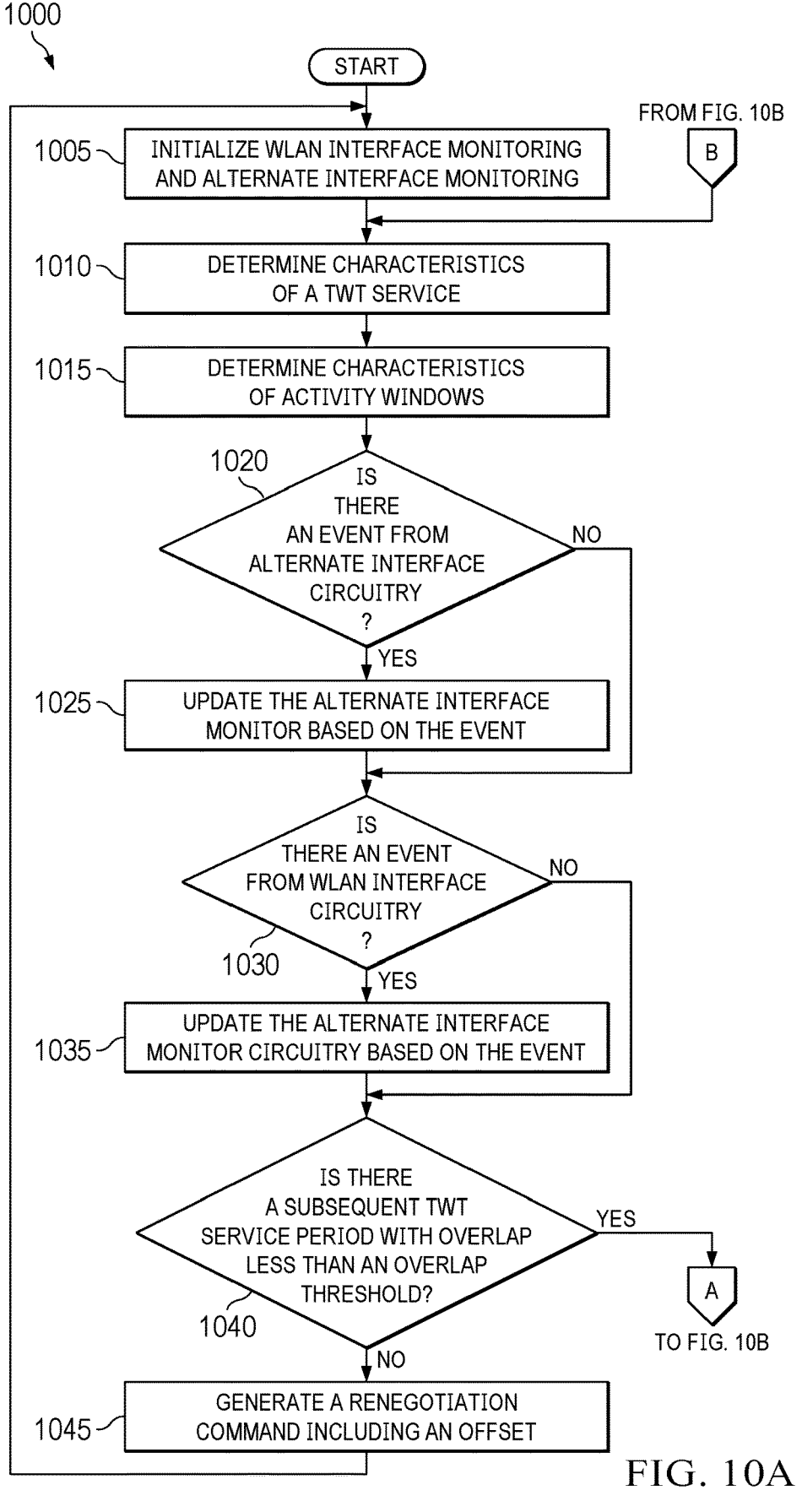

START

FROM FIG. 10B
B

1005 — INITIALIZE WLAN INTERFACE MONITORING AND ALTERNATE INTERFACE MONITORING

1010 — DETERMINE CHARACTERISTICS OF A TWT SERVICE

1015 — DETERMINE CHARACTERISTICS OF ACTIVITY WINDOWS

1020 — IS THERE AN EVENT FROM ALTERNATE INTERFACE CIRCUITRY ? — NO

YES

1025 — UPDATE THE ALTERNATE INTERFACE MONITOR BASED ON THE EVENT

IS THERE AN EVENT FROM WLAN INTERFACE CIRCUITRY ? — NO
1030

YES

1035 — UPDATE THE ALTERNATE INTERFACE MONITOR CIRCUITRY BASED ON THE EVENT

IS THERE A SUBSEQUENT TWT SERVICE PERIOD WITH OVERLAP LESS THAN AN OVERLAP THRESHOLD? — YES
1040

1045 — GENERATE A RENEGOTIATION COMMAND INCLUDING AN OFFSET

FIG. 10A

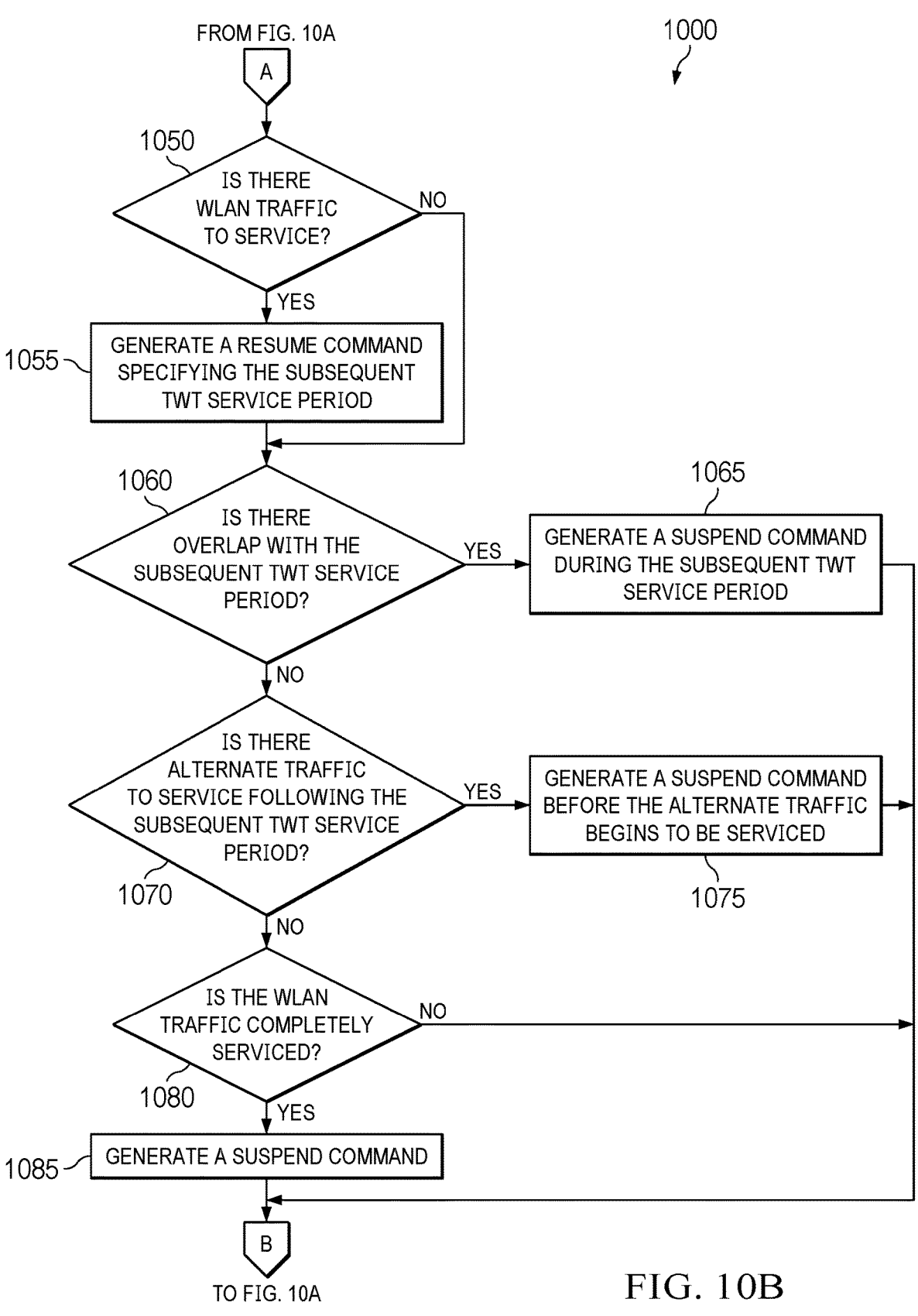

FROM FIG. 10A

A

1000

1050

IS THERE
WLAN TRAFFIC
TO SERVICE?

NO

YES

1055

GENERATE A RESUME COMMAND
SPECIFYING THE SUBSEQUENT
TWT SERVICE PERIOD

1060

IS THERE
OVERLAP WITH THE
SUBSEQUENT TWT SERVICE
PERIOD?

YES

1065

GENERATE A SUSPEND COMMAND
DURING THE SUBSEQUENT TWT
SERVICE PERIOD

NO

IS THERE
ALTERNATE TRAFFIC
TO SERVICE FOLLOWING THE
SUBSEQUENT TWT SERVICE
PERIOD?

YES

1075

GENERATE A SUSPEND COMMAND
BEFORE THE ALTERNATE TRAFFIC
BEGINS TO BE SERVICED

1070

NO

IS THE WLAN
TRAFFIC COMPLETELY
SERVICED?

NO

1080

YES

1085

GENERATE A SUSPEND COMMAND

METHODS AND APPARATUS TO OPPORTUNISTICALLY OPERATE A WLAN INTERFACE USING SHARED RESOURCES

CROSS-REFERENCE TO RELATED APPLICATION

This patent application claims the benefit of and priority to U.S. Provisional Patent Application No. 63/345,566 filed May 25, 2022, which application is hereby incorporated herein by reference in its entirety.

TECHNICAL FIELD

This description relates generally to wireless communications, and more particularly to methods and apparatus to opportunistically operate a WLAN interface using shared resources.

BACKGROUND

As wireless communication features become increasingly common, device designers and manufacturers are incentivized to include support for one or more protocols that support communications between devices. Devices may use protocols to expand functionality and include additional features, such as being able to update firmware, allow remote control, provide real-time data, etc. In some applications, wireless communications using a wireless local area network (WLAN) causes a device to need to include transmitter circuitry to send data to a network location, receiver circuitry to receive data from the network location, and controller circuitry to implement a communications protocol.

Device designers select a communications protocol based on cost, complexity, device functions, etc. For example, a designer may include circuitry to support IEEE 802.11 WLAN protocols (Wi-Fi) in an internet of things (IOT) device to allow users to connect to and control the IoT device using a WLAN. In another example, the designer may include circuitry to support Bluetooth protocols to allow users to connect to and control a device from their phone. In yet another example, the designer may include circuitry to support both Wi-Fi and Bluetooth to increase device accessibility.

SUMMARY

For methods and apparatus to opportunistically operate a Wi-Fi interface using shared resources, an example apparatus includes wireless local area network (WLAN) interface circuitry configured to communicate using a resource; alternate interface circuitry configured to use the resource; and coexistence controller circuitry coupled to the WLAN interface circuitry and the alternate interface circuitry, the coexistence controller circuitry including: a first interface monitor coupled to the WLAN interface circuitry, the first interface monitor configured to determine characteristics of a target wakeup time (TWT) service of the WLAN interface circuitry; a second interface monitor coupled to the alternate interface circuitry, the second interface monitor configured to determine characteristics of an alternate activity period window of the alternative interface circuitry; a coexistence comparator coupled to the first interface monitor and the second interface monitor, the coexistence comparator configured to determine a predicted TWT service period of the TWT service that overlaps with a subsequent alternate activity period window less than a threshold; and a service controller coupled to the WLAN interface circuitry and the coexistence comparator, the service controller configured to generate commands to modify operations of the WLAN interface circuitry based on the predicted TWT service period.

BRIEF DESCRIPTION OF THE DRAWINGS

FIGS. 10A-10B is a flowchart representative of an example process that may be performed using machine readable instructions that can be executed and/or hardware configured to implement the coexistence controller circuitry of FIGS. 1 and 4 to generate commands to control the WLAN interface circuitry of FIGS. 1 and 2.

The same reference numbers or other reference designators are used in the drawings to designate the same or similar (functionally and/or structurally) features.

DETAILED DESCRIPTION

Figure 1:
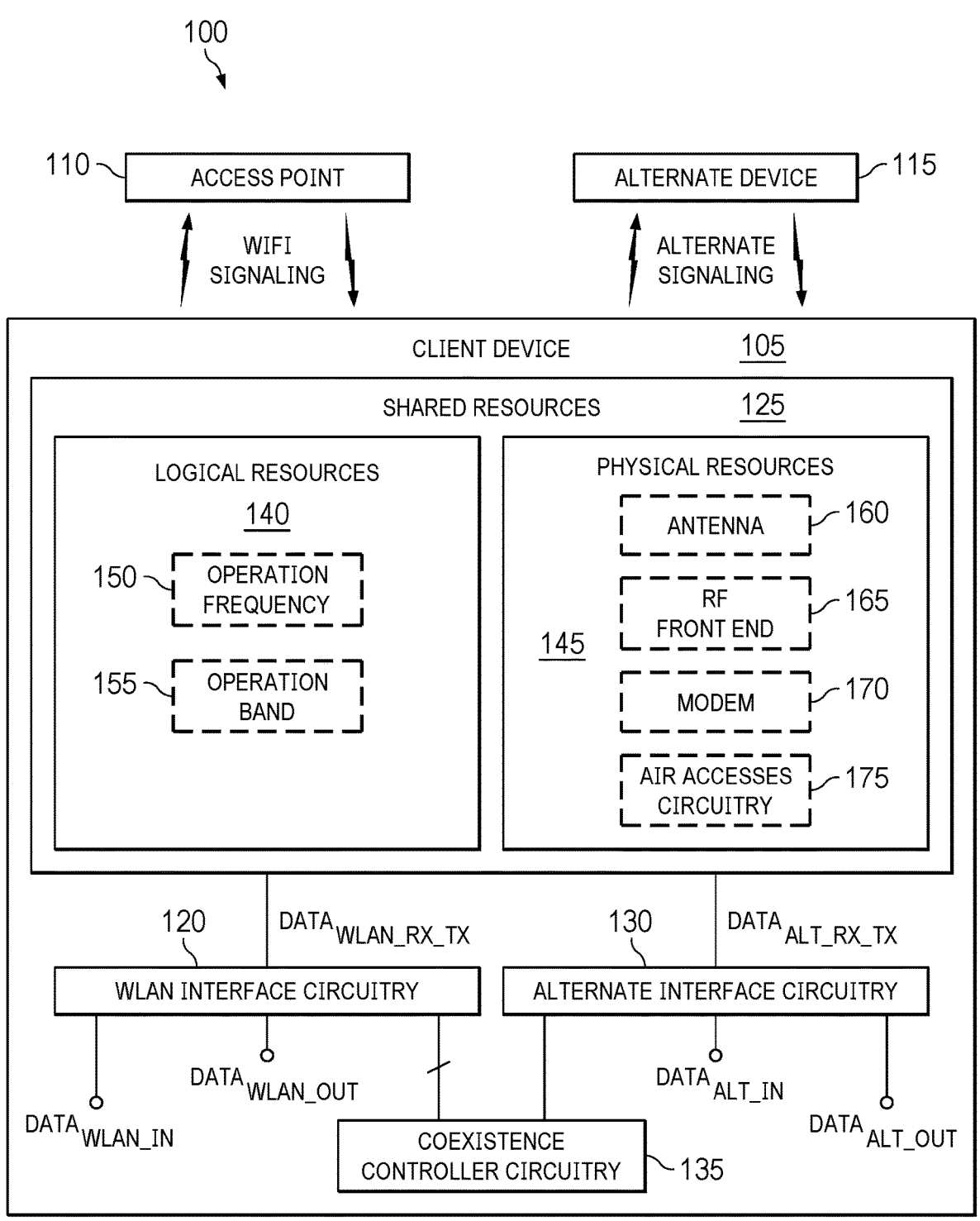
FIG. 1 is a block diagram of an example communication system including an example client device configured to use example WLAN interface circuitry, example alternate interface circuitry, and example coexistence controller circuitry to communicate with an example access point and an example alternate device.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

As wireless communication features become increasingly common, incentives for device designers to include support for wireless communications in their devices continues to increase. Devices may use wireless communications to expand functionality and include additional features, such as being able to update firmware, allow remote control, provide real-time data, etc. For example, a designer may include wireless communication circuitry in a security camera to allow users real-time access to a video stream and reduce installation complexity. In such an example, wireless communications allow additional accessibility and reduces installation complexity, which may attract additional consumers. Wireless communications typically need an integration of both hardware (e.g., transmitter circuitry, receiver circuitry, etc.) and software (e.g., communications protocols, system timing, data generation, etc.) to function properly. For example, a protocol may require accurate timing circuitry to support relatively short communication intervals.

Since the conception of wireless communication, a plurality of different methods of wireless communication have been developed, such as IEEE 802.11 (Wi-Fi) protocols. IEEE 802.15.4 (Zigbee) protocols. Bluetooth protocols. Bluetooth low energy (BLE) protocols. Long Term Evolution (LTE). LTE-Machine Type Communication (LTE-M). Narrow Band LTE (NB-LTE). Sub-Gigahertz Communication (sub1G). EEE 802.15.4. Wireless Sensor Networks (WSNs). Wireless Battery Management System (WBMS), etc. Such methods of wireless communication require circuitry capable of implementing a method specific protocol. For example, a device that includes WLAN interface circuitry may access the internet by using Wi-Fi protocols and resources to communicate with an access point.

Communication protocols include individual characteristics of the communications, such as frequency of transmission, data rates, activity periods, service periods, etc. Communication circuitry needed to support a specific protocol may be capable of supporting multiple different types of communication. For example, an antenna designed for 2.4 gigahertz (GHz) transmissions may be used for both Wi-Fi and Bluetooth communications. However, communication circuitry only supports the operations of one communication protocol at a time. For example, an application which uses an antenna to support both Wi-Fi and Bluetooth communication may only be configured to receive Wi-Fi data or Bluetooth data at any given time. Such limitations in configurations of communication circuitry are typically overcome by including communication circuitry for each communication protocol, which may double the communication circuitry.

Designers may select to support a specific protocol based on system constraints, such as a system-on-chip (SoC) size constraint, power consumption constraints, cost constraints, availability, responses time, reliability, etc. One method of ensuring communication circuitry meets system constraints is to select a single communication protocol. However, some devices would advantage from supporting a plurality of protocols operating simultaneously. Devices that intend to include more than one protocol need to account for logical resources (e.g., operating frequency, operating bandwidth, etc.) of each protocol. Issues with logical resources may be resolved by including separate circuitry for each protocol.

The addition of a plurality of separate instances of the same circuitry results in increases to both device cost and size.

The examples disclosed herein include methods and apparatus to opportunistically operate Wi-Fi services and other device coordinated services using shared resources. In some described examples, a device includes coexistence controller circuitry which orchestrates WLAN interface circuitry and alternate interface circuitry. The coexistence controller circuitry issues commands to suspend and resume a target wake up time (TWT) service of the WLAN interface circuitry. The commands cause the WLAN interface circuitry to modify the TWT service to accommodate for operations of the alternate interface circuitry as needed. The coexistence controller circuitry may re-negotiate timing the TWT service based on predictions of subsequent overlaps between activities of both a WLAN protocol, implemented by the WLAN interface circuitry, and an alternate protocol, implemented by the alternate interface circuitry. Advantageously, the coexistence controller circuitry reduces a cost and size of circuitry needed to include a plurality of protocols in a device by allowing the plurality of protocols to share resources.

FIG. 1 is a block diagram of an example communication system 100 including an example client device 105 configured to communicate with an example access point 110 and an example alternate device 115. The communication system 100 is configured to exchange data between the client device 105, the access point 110, and the alternate device 115. The client device 105 is communicatively coupled to the access point 110 using signaling defined by a WLAN IEEE 802.11ax (Wi-Fi 6) protocol. Alternatively, the client device 105 may implement IEEE 802.11be (Wi-Fi 7) protocol or any IEEE 802.11 protocol which includes target wakeup time (TWT) signaling to communicate with the access point 110. TWT signaling is described in further detail, below. Wi-Fi signaling is an exchange of communications, commands, and/or data packets, based on Wi-Fi protocols. Additionally, the client device 105 is communicatively coupled to the alternate device 115 by an alternate method of signaling. For example, the client device 105 may be communicatively coupled to the alternate device 115 using signaling defined by a Bluetooth low energy (BLE) protocol. Although the alternate device 115 is illustrated to be in wireless communication with the client device 105 in connection with FIG. 1, the client device 105 may be in communication with the alternate device 115 by a physical connection, such as a connector. Alternatively, communications between the client device 105 and the alternate device 115 may use an alternate communication protocol in accordance with the teachings disclosed herein, such as LTE, LTE-M, NB-LTE, sub1G, EEE 802.15.4, WSNs, WBMS, etc.

In the example of FIG. 1, the client device 105 includes example WLAN interface circuitry 120, example shared resources 125, example alternate interface circuitry 130, and example coexistence controller circuitry 135. The client device 105 is configured to wirelessly communicate with the access point 110 using Wi-Fi signaling implemented by the WLAN interface circuitry 120. The client device 105 is configured to wirelessly communicate with the alternate device 115 using an alternate method signaling implemented by the alternate interface circuitry 130. The coexistence controller circuitry 135 orchestrates usage of the shared resources 125 between the WLAN interface circuitry 120 and the alternate interface circuitry 130. For example, the coexistence controller circuitry 135 prevents the WLAN interface circuitry 120 from servicing WLAN traffic using the shared resources 125 while the alternate interface circuitry 130 uses the shared resources 125. Advantageously, the coexistence controller circuitry 135 reduces a number of instances of the shared resources 125 needed to support a plurality of protocols by orchestrating usage of the shared resources 125.

The WLAN interface circuitry 120 is coupled to the shared resources 125 and the coexistence controller circuitry 135. The WLAN interface circuitry 120 converts data at a WLAN data input (DATA$_{WLAN\_IN}$) into one or more Wi-Fi commands which may be transmitted to the access point 110 using the shared resources 125. The WLAN interface circuitry 120 converts Wi-Fi commands received by the shared resources 125, from the access point 110, into data at a WLAN data output (DATA$_{WLAN\_OUT}$). In some examples, the WLAN interface circuitry 120 is instantiated by processor circuitry executing instructions and/or configured to perform operations such as those represented by the flowcharts of FIGS. 7 and 8.

The WLAN interface circuitry 120 accesses the shared resources 125 based on a TWT service and commands from the coexistence controller circuitry 135. A TWT service is a servicing policy, agreed to by the client device 105 and the access point 110, that establishes periods of time wherein the access point 110 may be used to service WLAN traffic of the client device 105. Such periods of time comprising a TWT service are referred to as TWT service periods. TWT service periods comprising a TWT service occur at nearly periodic sequences of time and correspond to times that the WLAN interface circuitry 120 may access the shared resources 125. For example, a TWT service may be an agreement for the access point 110 to provide an opportunity to service WLAN traffic of the client device 105 for approximately twenty-five milliseconds (mS) every one-hundred milliseconds. In such an example, the TWT service period is twenty-five milliseconds and the duration between TWT service periods is approximately one-hundred milliseconds. The TWT service is considered to be active or established while the WLAN interface circuitry 120 uses the agreed-up timing of the TWT service periods. The TWT service is considered to be inactive when the WLAN interface circuitry 120 is not implementing a TWT service, such as a discontinuation of nearly periodic TWT service periods. Advantageously, the WLAN interface circuitry 120 does not need access to the shared resources 125 between service periods.

The WLAN interface circuitry 120 determines whether to access the shared resources 125 based on commands from the coexistence controller circuitry 135. For example, the WLAN interface circuitry 120 may determine to access the shared resources 125 based on a command from the coexistence controller circuitry 135 that enables access. Commands from the coexistence controller circuitry 135 are discussed in further detail below, in connection with FIGS. 2 and 4. Advantageously, the coexistence controller circuitry 135 may issue commands to orchestrate use of the shared resources 125 by the WLAN interface circuitry 120.

The WLAN interface circuitry 120 generates WLAN signaling events to represent operations of the WLAN interface circuitry 120. For example, the WLAN interface circuitry 120 may generate an event to represent a start of a TWT service period and/or an end of an of the TWT service period. In such an example, the start of a TWT service period and the end of a TWT service period are generated at nearly periodic intervals in response to the agreed upon active TWT service. The WLAN interface circuitry 120 supplies the WLAN signaling events to the coexistence controller circuitry 135. Examples of the WLAN signaling events, which are supplied to coexistence controller circuitry 135, are discussed in further detail, below, in connection with FIGS. 2 and 4.

The shared resources 125 are communicatively coupled to the access point 110 and the alternate device 115. The shared resources 125 are coupled to the WLAN interface circuitry 120 and the alternate interface circuitry 130. In the example of FIG. 1, the shared resources 125 include example logical resources 140 and example physical resources 145. The interface circuitries 120 and 130 use the logical resources 140 to transmit and/or receive communications by accessing the physical resources 145.

The logical resources 140 are logical characteristics of the protocols that are shared between the communications protocols of the interface circuitry 120 and 130. In the example of FIG. 1, the logical resources 140 include an example operation frequency 150 and an operation bandwidth 155. The operation frequency 150 is a frequency of signaling. The operation bandwidth 155 is a bandwidth representative of a data rate of the data transmissions. For example, Wi-Fi shares a portion of the potential six-hundred gigabits per second (Gbps) data rate with Bluetooth's one gigabit per second (Gbps). Advantageously, protocols, which share the logical resources 140, are likely able to share the physical resources 145.

The physical resources 145 is circuitry which enables wireless transmission and reception of data. In the example of FIG. 1, the physical resources 145 include an example antenna 160, an example radio frequency (RF) front end 165, an example modem 170, and example air accesses circuitry 175. The physical resources 145 are selected based on characteristics of operation, which are optimal for the communications protocols of the WLAN interface circuitry 120 and the alternate interface circuitry 130. Advantageously, the coexistence controller circuitry 135 reduces cost, size, and complexity of the physical resources 145 by orchestrating access to the physical resources 145 between the interface circuitry 120 and 130.

The antenna 160 is an electrical component which enables wireless transmission and/or reception of data. The antenna 160 includes a bandwidth of operation which optimizes a range of transmission, signal strength, etc. Although in the example of FIG. 1, the antenna 160 is illustrated internal to the client device 105, the antenna 160 may be illustrated external to the client device 105.

The RF front end 165 includes circuitry to transmit data, such as a low-noise amplifier (LNA), filter circuitry, phase lock loop (PLL) circuitry, a multiplexer (MUX), etc. The RF front end 165 amplifies a power of a signal prior to transmission. The RF front end 165 may impedance match one or more of the physical resources 145 to increase a magnitude of power of a transmission. For example, the RF front end 165 may impedance match the antenna 160 to increase power used to transfer data. The RF front end 165 may include a characteristic of operation that specifies an optimal bandwidth of operation.

The modem 170) translates digital data into analog signals and vice versa. The modem 170 converts digital data from the interface circuitry 120 or 130 into analog signal, which may be transmitted. The modem 170 converts received analog signals into digital data for the interface circuitry 120 or 130.

The air accesses circuitry 175 is circuitry configured to implement network and/or device specific access information to communications from the WLAN interface circuitry 120 and/or the alternate interface circuitry 130. For example, the air accesses circuitry 175 may modify transmissions from the WLAN interface circuitry 120 to include network specific credentials which allow the access point 110 to identify the client device 105. The air accesses circuitry 175 may include encryption and/or decryption information which allows the client device 105 to support secure communications.

The alternate interface circuitry 130 is coupled to the shared resources 125 and the coexistence controller circuitry 135. The alternate interface circuitry 130 converts data at an alternate data input (DATA$_{ALT\_IN}$) into one or more commands which may be transmitted to the alternate device 115 using the shared resources 125. The alternate interface circuitry 130 converts commands received by the shared resources 125, from the alternate device 115, into data at an alternate data output (DATA$_{ALT\_OUT}$). In the example of FIG. 1, the alternate interface circuitry 130 is an alternate instance of circuitry configured to communicate with an external device using a communications protocol. As used herein, "alternate" refers to such a separate instance of a communication protocol, capable of operations independent of the WLAN interface circuitry 120. In some examples, the alternate interface circuitry 130 is instantiated by processor circuitry executing instructions and/or configured to perform operations such as those represented by the flowchart of FIG. 9.

The alternate interface circuitry 130 accesses the shared resources 125 based on an alternate activity period window. Alternate activity period windows are periodic times that the alternated interface circuitry may access the shared resources 125 and where the client device 105 and the alternate device 115 communicate using an alternate method signaling. During the alternate activity period windows, the coexistence controller circuitry 135 may prevent the WLAN interface circuitry 120 from accessing the shared resources 125 by generating a suspend command. Example alternate activity period windows are illustrated and discussed in connection with FIGS. 5A, 5B, and 6, below. Additionally, example operations of the coexistence controller circuitry 135 to prevent both the WLAN interface circuitry 120 and the alternate interface circuitry 130 from accessing the shared resources 125 at the same time are discussed below in connection with FIGS. 7-10.

The alternate interface circuitry 130 generates alternate signaling events to represent operations between the client device 105 and the alternate device 115. For example, the alternate interface circuitry 130 may generate an event to represent a start of an alternate activity period window and/or an end of an alternate activity period window. Examples of the alternate signaling events that are supplied to coexistence controller circuitry 135 are discussed in further detail, below; in connection with FIGS. 3 and 4. The alternate interface circuitry 130 supplies the alternate signaling events to the coexistence controller circuitry 135.

The coexistence controller circuitry 135 is coupled to the WLAN interface circuitry 120 and the alternate interface circuitry 130. The coexistence controller circuitry 135 orchestrates access to the shared resources 125 based on events from the WLAN interface circuitry 120 and alternate interface circuitry 130. For example, the coexistence controller circuitry 135 may prevent the WLAN interface circuitry 120 from accessing the shared resources 125 to allow the alternate interface circuitry 130 to access the shared resources 125. The coexistence controller circuitry 135 includes circuitry (illustrated in connection with FIG. 4, below) to predict timing of potential TWT service periods based on events from the WLAN interface circuitry 120. The coexistence controller circuitry 135 includes circuitry (illustrated in connection with FIG. 4, below) to predict timing of potential alternate activity period windows based on events from the alternate interface circuitry 130. The coexistence controller circuitry 135 uses the potential TWT service periods and the potential alternate activity period windows to determine whether to allow the WLAN interface circuitry 120 to access the shared resources 125 at a given time. In some examples, the coexistence controller circuitry 135 is instantiated by processor circuitry executing instructions and/or configured to perform operations such as those represented by the flowchart of FIG. 10.

The coexistence controller circuitry 135 generates a TWT resume command to define at least a portion of an active TWT service as capable of accessing the shared resources 125. During a TWT service period, specified by the TWT resume command, the WLAN interface circuitry 120 has exclusive access to the shared resources 125. For example, the coexistence controller circuitry 135 issues a TWT resume command to allow the WLAN interface circuitry 120 to service incoming and/or outgoing WLAN traffic. In such an example, the coexistence controller circuitry 135 may delay generating the TWT resume command to allow the alternate interface circuitry 130 to complete servicing incoming and/or outgoing alternate traffic.

The coexistence controller circuitry 135 generates a TWT suspend command to suspend at least a portion of a TWT service without inactivating the TWT service, such as a portion of or a plurality of TWT service periods. The duration of an active TWT service following a TWT suspend command, corresponds to a time that the WLAN interface circuitry 120 is prevented from accessing the shared resources 125. For example, the coexistence controller circuitry 135 generates a TWT suspend command to allow the alternate interface circuitry 130 to service incoming and/or outgoing alternate traffic using the shared resources 125.

The coexistence controller circuitry 135 may be configured to prioritize WLAN signaling based on a type of WLAN traffic. For example, the coexistence controller circuitry 135 may allow the WLAN interface circuitry 120 to continue to access the shared resources 125 based on a determination that the WLAN traffic is to update, modify, and/or provide encryption data. In another example, the WLAN interface circuitry 120 may be prioritized based on a determination that the WLAN traffic is time sensitive, such that usefulness of the WLAN traffic substantially decreases after a duration of time.

An example implementation of the coexistence controller circuitry 135 is illustrated and discussed in connection with FIG. 4, below. Example operations of the coexistence controller circuitry 135 are illustrated and discussed in connection with FIGS. 5A-6, 10A, and 10B, below. Advantageously, the coexistence controller circuitry 135 reduces a need for separate instances of the physical resources 145 for each method of communication by orchestrating access to the shared resources 125.

Figure 2:
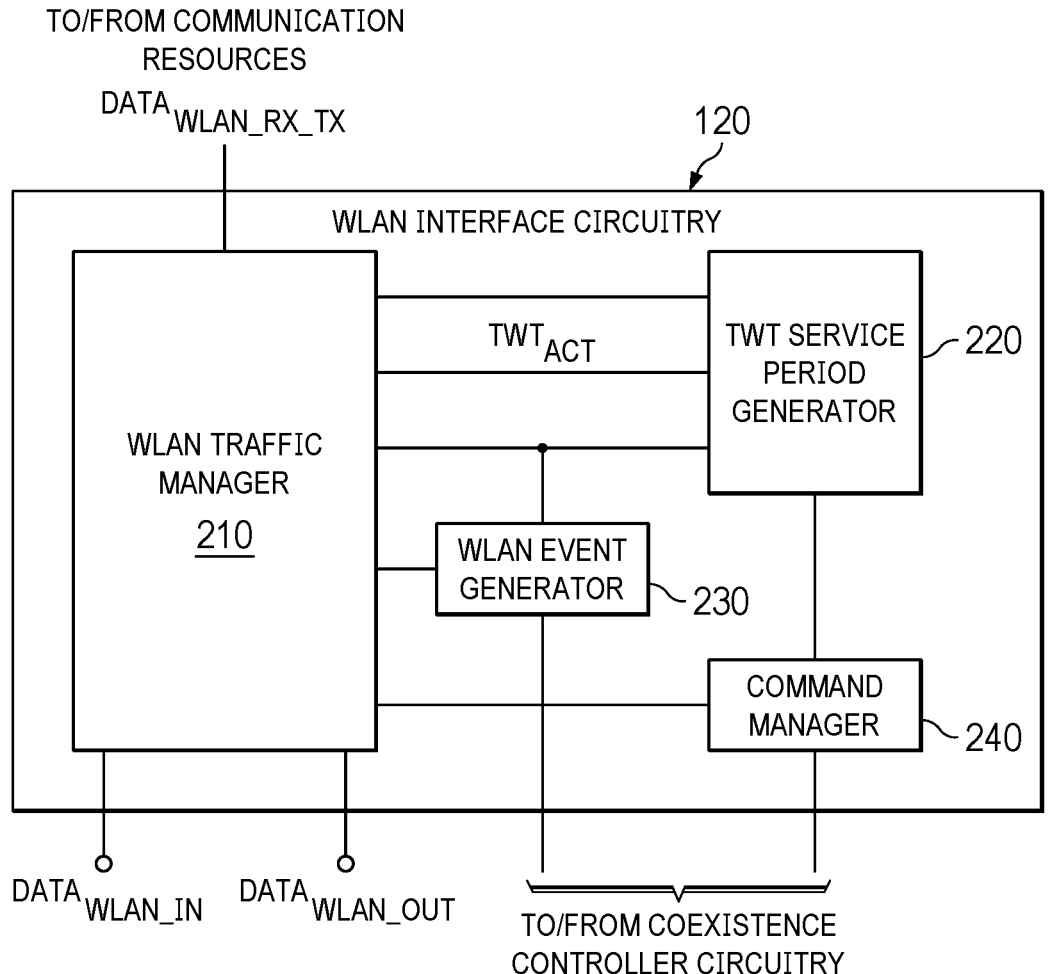
FIG. 2 is a block diagram of an example implementation of the WLAN interface circuitry of FIG. 1.

FIG. 2 is a block diagram of an example implementation of the WLAN interface circuitry 120 of FIG. 1. In the example of FIG. 2, the WLAN interface circuitry 120 includes an example WLAN traffic manager 210, an example TWT service generator 220, an example WLAN event generator 230, and an example command manager 240. The WLAN interface circuitry 120 uses the WLAN traffic manager 210 to transmit and receive data based on a TWT service, generated by the TWT service generator 220. The WLAN event generator 230) generates events that characterize operations of the WLAN interface circuitry 120 and the TWT service. The command manager 240 modifies operations of the WLAN interface circuitry 120 during TWT service periods of the TWT service based on commands from the coexistence controller circuitry 135.

The WLAN traffic manager 210 is coupled to the shared resources 125 of FIG. 1, the TWT service generator 220, the WLAN event generator 230, and the command manager 240. The WLAN traffic manager 210 implements IEEE 802.11ax communication standards (Wi-Fi protocols) to construct one or more WLAN commands that allows data supplied to the WLAN data input (DATA$_{WLAN\_IN}$) to be transmitted. Alternatively, the WLAN traffic manager 210) may implement any IEEE 802.11 communication standard that supports TWT signaling as described herein.

The WLAN traffic manager 210 uses the shared resources 125 to transmit one or more WLAN commands based on the TWT service generated by the TWT service generator 220 and a resume command from the coexistence controller circuitry 135. A resume command indicates a TWT service period of the TWT service that the WLAN traffic manager 210 may use to service WLAN traffic. For example, the WLAN traffic manager 210 may access the shared resources 125 during at least a portion of a TWT service period of the active TWT service that is identified in a resume command. The WLAN traffic manager 210 receives WLAN commands from the access point 110 by the shared resources 125 during a TWT service period specified in a resume command or a TWT service period that follows the specified TWT service period. The WLAN traffic manager 210 uses WLAN protocols to convert the received WLAN commands to data at the WLAN data output (DATA$_{WLAN\_OUT}$).

The WLAN traffic manager 210 tracks WLAN signaling between the client device 105 and the access point 110. The WLAN traffic manager 210 predicts whether subsequent TWT service periods of the active TWT service may be needed to service WLAN traffic. The WLAN traffic manager 210 supplies the WLAN event generator 230 with a traffic data indicating whether there is or predicted to be WLAN traffic that needs to be serviced using the shared resources 125. The WLAN traffic manager 210 updates the traffic data following a determination that the WLAN traffic has been serviced and no longer needs access to the shared resources 125.

The TWT service generator 220 is coupled to the WLAN traffic manager 210, the WLAN event generator 230, and the command manager 240. The WLAN traffic manager 210 communicates with the TWT service generator 220 to establish an agreement on timing of a TWT service. Such an agreement may be referred to as a TWT service negotiation. The TWT service generator 220 activates the TWT service by generating nearly periodic TWT service periods based on the agreement to establish the TWT service. The TWT service generator 220 supplies generated TWT service periods to the WLAN traffic manager 210 and the WLAN event generator 230.

The TWT service generator 220 suspends a portion of a TWT service period and/or TWT service periods following the command manager 240 receiving a TWT suspend command. Timing of TWT service periods, established by the TWT service, remains unchanged following a TWT suspend command. The TWT service generator 220 may suspend the TWT service by failing to supply TWT service periods to the WLAN traffic manager 210. The TWT service generator 220 resumes a portion of a TWT service period and/or TWT service periods following the command manager 240 receiving a TWT resume command. The TWT resume command may include data indicating a specific TWT service period of the TWT service to resume. The TWT service generator 220 may resume the TWT service by supplying TWT service periods to the WLAN traffic manager 210.

The TWT service generator 220 renegotiates the TWT service following the command manager 240) receiving a TWT renegotiate command. The TWT renegotiate command may include data which causes the renegotiated TWT service to be offset compared to a previous TWT service. Similar to the TWT negotiation, the TWT service generator 220) establishes a TWT service using the WLAN traffic manager 210.

The WLAN event generator 230 is coupled to the coexistence controller circuitry 135, the WLAN traffic manager 210, and the TWT service generator 220. The WLAN event generator 230 generates WLAN signaling events to represent operations of the WLAN interface circuitry 120 and a TWT service. In the example of FIG. 2, the WLAN signaling events include a start of a TWT service period, an end of a TWT service period, traffic to service, and/or servicing traffic complete.

The WLAN event generator 230 generates events that represent the TWT service implemented by the TWT service generator 220. The WLAN event generator 230 generates a start of a TWT service period event in response to determining the TWT service period generator 220 has started a TWT service period. The WLAN interface circuitry 120 generates an end of a TWT service event in response to determining the TWT service period generator 220) has ended a TWT service period or following a determination that the TWT service is no longer needed, such as determining all traffic has been serviced. In example operation, a time between a start of a TWT service period event and an end of a TWT service period event corresponds to the timing of a TWT service established during a TWT negotiation. The WLAN interface circuitry 120 supplies the WLAN signaling events to the coexistence controller circuitry 135.

The WLAN event generator 230 uses traffic data from the WLAN traffic manager 210 to generate traffic events. The WLAN event generator 230 generates a traffic to service event in response to a determination, by the WLAN traffic manager 210, that there is data to transmit to and/or receive from the access point 110. The WLAN interface circuitry 120 may generate a traffic to service event in response to a determination that the WLAN traffic manager 210 is expecting and/or predicting WLAN traffic to service during a subsequent TWT service period. In some instances, the WLAN event generator 230 may generate a traffic to service event to determine whether there is data to receive from the access point 110. The WLAN interface circuitry 120 generates a servicing traffic complete event in response to a determination that there is no longer any data to transmit to or receive from the access point 110, such as a completion of servicing WLAN traffic.

The command manager 240) is coupled to the coexistence controller circuitry 135 and the TWT service generator 220. The coexistence controller circuitry 135 supplies commands to the command manager 240. The command manager 240 modifies operations of the TWT service based on the commands from the coexistence controller circuitry 135. In the example of FIG. 2, the commands from the coexistence controller circuitry 135 may be one of a TWT resume command, a TWT suspend command, and a TWT renegotiate command. The command manager 240) modifies operations of the TWT service generator 220 in response to receiving a command.

The command manager 240 causes the TWT service generator 220 to resume a TWT service in response to receiving a TWT resume command. The command manager 240 may select to resume the TWT service following a TWT service period specified in the resume command. For example, the command manager 240 causes the TWT service generator 220 to resume the TWT service in response to a TWT resume command that specifies to wait zero TWT service periods to resume. In another example, the command manager 240) causes the TWT service generator 220 to resume the TWT service after four TWT service periods in response to a TWT resume command indicating to resume after four TWT service periods. The command manager 240) causes the TWT service generator 220 to suspend a TWT service in response receiving a TWT suspend command. Advantageously, the coexistence controller circuitry 135 may prevent the WLAN interface circuitry 120 from accessing the shared resources 125 by issuing a TWT suspend command to suspend a TWT service.

The command manager 240) causes the TWT service generator 220 to renegotiate the TWT service in response to receiving a TWT renegotiate command. The command manager 240 may prove offset data from the TWT renegotiate command to TWT service generator 220. The offset data optimizes usage of the shared resources 125 by causing a renegotiated TWT service to be offset from a previous TWT service. Advantageously, the coexistence controller circuitry 135 may modify timing of the TWT service to optimize usage of the shared resources 125.

Figure 3:
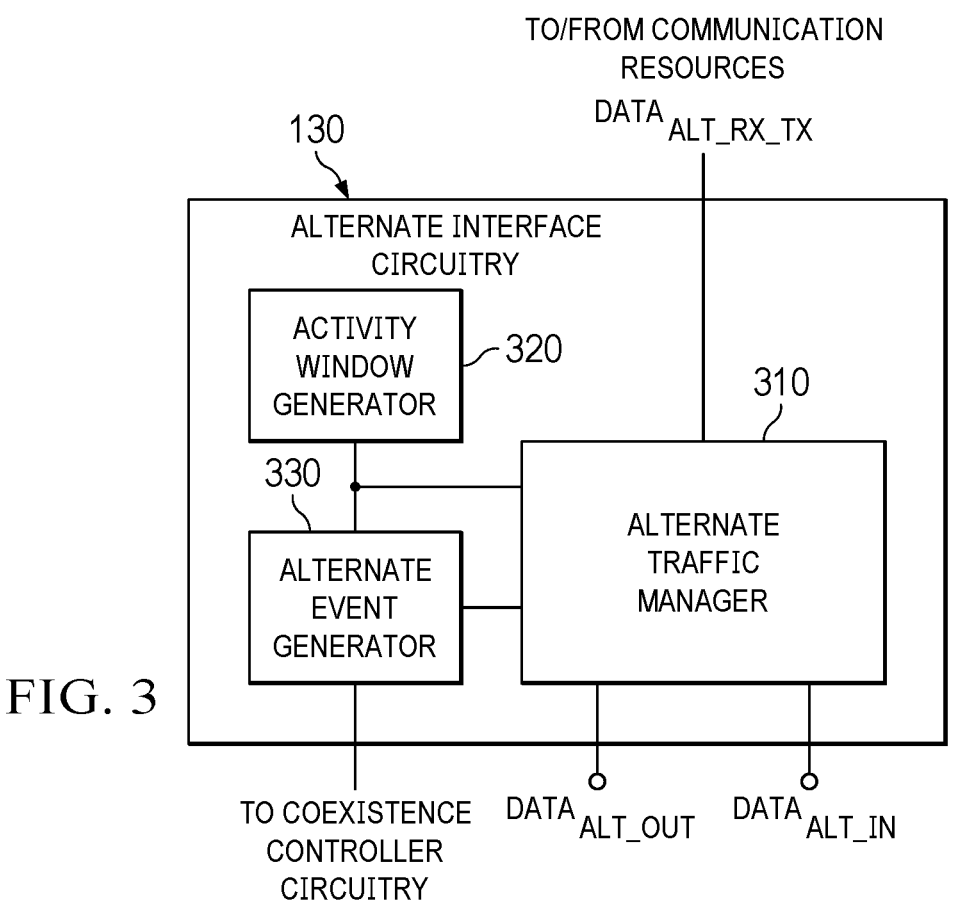
FIG. 3 is a block diagram of an example implementation of the alternate interface circuitry of FIG. 1.

FIG. 3 is a block diagram of an example implementation of the alternate interface circuitry 130 of FIG. 1. In the example of FIG. 3, the alternate interface circuitry 130 includes an example alternate traffic manager 310, an example activity window generator 320, and an example alternate event generator 330. The alternate interface circuitry 130 uses the alternate traffic manager 310 to transmit and/or receive data during alternate activity period windows. The alternate activity period windows are established by the activity window generator 320. The alternate event generator 330 generates events that characterize operations of the alternate interface circuitry 130.

The alternate traffic manager 310 is coupled to the shared resources 125 of FIG. 1, the activity window generator 320, and the alternate event generator 330. The alternate traffic manager 310) uses a protocol to construct one or more commands allowing for data supplied to the alternate data input (DATA$_{ALT\_IN}$) to be transmitted. The alternate traffic manager 310 tracks alternate signaling between the client device 105 and the alternate device 115. The alternate traffic manager 310 predicts whether subsequent alternate activity period windows may be needed to service additional alternate traffic. The alternate traffic manager 310 uses the shared resources 125 to transmit the one or more commands during an alternate activity period window generated by the activity window generator 320. The alternate traffic manager 310 receives one or more commands from the shared resources 125 during an alternate activity period window generated by the activity window generator 320. The alternate traffic manager 310 uses a protocol to convert the received one or more commands to data at the alternate data output (DATA$_{ALT\_OUT}$).

The activity window generator 320 is coupled to the alternate traffic manager 310, and the alternate event generator 330. The activity window generator 320 generates predictable (e.g., periodic, nearly periodic, etc.) alternate activity period windows as a result of an alternate activity period window protocol shared with the alternate device 115 of FIG. 1 and implemented by the alternate traffic manager 310. The activity window generator 320 supplies the generated alternate activity period window to the alternate traffic manager 310 and the alternate event generator 330.

The alternate event generator 330 is coupled to the coexistence controller circuitry 135, the alternate traffic manager 310, and the activity window generator 320. The alternate event generator 330 generates alternate signaling events that represent operations of the alternate interface circuitry 130. In the example of FIG. 3, the alternate signaling events include a start of an alternate activity period window; an end of an alternate activity period window, traffic to service, and/or servicing traffic complete.

The alternate event generator 330 generates events that indicate operations of the alternate traffic manager 310 based traffic data from the alternate traffic manager 310. The alternate interface circuitry 130 generates a traffic to service event when there is data to transmit to or receive from the alternate device 115. In some instances, the alternate interface circuitry 130 may generate a traffic to service event to determine whether there is data to receive from the alternate device 115. The alternate interface circuitry 130 generates a servicing traffic complete event in response to a determination that there is no longer any data to transmit to and/or receive from the alternate device 115.

The alternate event generator 330 generates events that indicate operations of the activity window generator 320 based on the generated alternate activity period windows. The alternate event generator 330 generates a start of an alternate activity period window event at a beginning of an alternate activity period window. The alternate interface circuitry 130 generates an end of an alternate activity period window event at the end of an alternate activity period window. The alternate interface circuitry 130 supplies the alternate signaling events to the coexistence controller circuitry 135.

Figure 4:
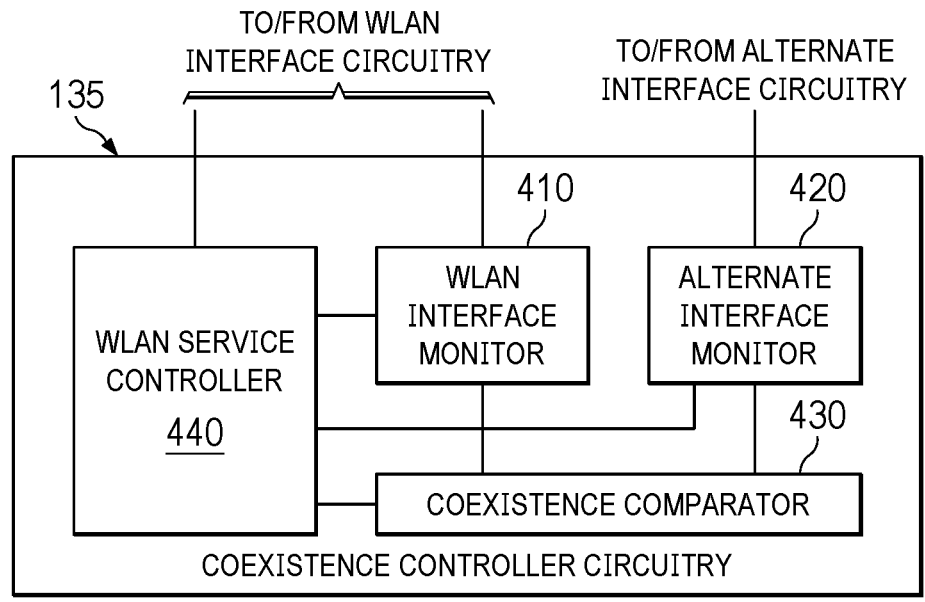
FIG. 4 is a block diagram of an example implementation of the coexistence controller circuitry of FIG. 1 configured to orchestrate communications of the WLAN interface circuitry of FIGS. 1 and 2 and the alternate interface circuitry of FIGS. 1 and 3.

FIG. 4 is a block diagram of an example implementation of the coexistence controller circuitry 135 of FIG. 1 configured to support a plurality of communication protocols using the shared resources 125 of FIG. 1. In the example of FIG. 4, the coexistence controller circuitry 135 includes an example WLAN interface monitor 410, an example alternate interface monitor 420, an example coexistence comparator 430, and an example WLAN service controller 440. The coexistence controller circuitry 135 monitors the WLAN interface circuitry 120 of FIG. 1 and the alternate interface circuitry 130 of FIG. 1 using the interface monitors 410 and 420. The coexistence controller circuitry 135 compares timing of potential TWT service periods and alternate activity period windows when data is predicted to be transmitted and/or received by either of the WLAN interface circuitry 120 and/or the alternate interface circuitry 130. The coexistence controller circuitry 135 issues TWT suspend, TWT resume, and/or TWT renegotiate commands to modify the TWT service. Advantageously, the coexistence controller circuitry 135 allows the WLAN interface circuitry 120 to access the shared resources 125 based on considerations of both of the WLAN interface circuitry 120 and the alternate interface circuitry 130.

The WLAN interface monitor 410 is coupled to the WLAN interface circuitry 120, the coexistence comparator 430), and the WLAN service controller 440). The WLAN interface monitor 410 receives WLAN signaling events from the WLAN interface circuitry 120. The WLAN interface monitor 410) determines characteristics of the TWT service based on the signaling events. Such characteristics of the TWT service may be referred to as properties of the TWT service. The WLAN interface monitor 410 characterizes a TWT service period of the TWT service as an amount of time between a start of a TWT service event and an end of the TWT service event. The WLAN interface monitor 410 characterizes a duration between TWT service periods of the TWT service as an amount of time between an end of a TWT service event and a subsequent start of a TWT service event. The WLAN interface monitor 410 may include counter circuitry (not illustrated) to represent the amount of time between events in reference to a number of clock cycles. The WLAN interface monitor 410 supplies the determined characteristics of the TWT service to the coexistence comparator 430. Alternatively, the WLAN interface monitor 410) may determine the characteristics of the TWT service based on TWT service specific data from the WLAN interface circuitry 120.

The WLAN interface monitor 410 uses the signaling events from the WLAN interface circuitry 120 to supply timing data, which indicates a start of TWT service periods, to the coexistence comparator 430. The WLAN interface monitor 410 uses signaling events from the WLAN interface circuitry 120 to supply WLAN traffic data, indicating whether there is and/or predicts WLAN traffic to service, to the WLAN service controller 440.

The alternate interface monitor 420 is coupled to the alternate interface circuitry 130, the coexistence comparator 430, and the WLAN service controller 440. The alternate interface monitor 420) receives alternate signaling events from the alternate interface circuitry 130. The alternate interface monitor 420 determines characteristics of the alternate activity period windows based on intervals between signaling events. Such characteristics of the alternate activity period windows may be referred to as properties of the alternate activity period windows.

The alternate interface monitor 420 determines a period of an alternate activity period window as an amount of time between a start of an alternate activity period window event and an end of an alternate activity period window event. The alternate interface monitor 420 determines a duration between alternate activity period windows as an amount of time between an end of an alternate activity period window event and a start of an alternate activity period window event. The alternate interface monitor 420 may include counter circuitry (not illustrated) to represent the amount of time between events in reference to a number of clock cycles. The alternate interface monitor 420 supplies the determined characteristics of the alternate activity period windows to the coexistence comparator 430.

The alternate interface monitor 420 supplies timing data, which indicates a start of alternate activity period windows, to the alternate interface circuitry 130. The alternate interface monitor 420 uses signaling events from the alternate interface circuitry 130 to supply alternate traffic data, indicating whether there is and/or predicts alternate traffic to service, to the WLAN service controller 440.

The coexistence comparator 430 is coupled to the WLAN interface monitor 410, the alternate interface monitor 420, and the WLAN service controller 440. The coexistence comparator 430) predicts TWT service periods using the characteristics of the TWT service period from the WLAN interface monitor 410. The coexistence comparator 430 predicts alternate activity period windows using the characteristics of the alternate activity period windows from the alternate interface monitor 420.

The coexistence comparator 430 determines whether the predicted TWT service periods and the predicted alternate activity period windows overlap. For example, the coexistence comparator 430 predicts an alternate activity period window will start approximately halfway through a potential TWT service by comparing the predicted TWT service periods to the predicted alternate activity period windows. In such an example, the coexistence comparator 430 predicts an end of a predicted TWT service period of the TWT service by adding the determined period of the TWT service period to a start of the predicted TWT service period.

The coexistence comparator 430 may determine whether a magnitude of the overlap is less than an overlap threshold based on the predicted TWT service periods and an overlapping predicted alternate activity period window. For example, the coexistence comparator 430 may predict subsequent TWT service periods of the TWT service and alternate activity period windows until a TWT service period is predicted that overlaps less than a ten percent threshold with a subsequent alternate activity period window. Alternatively, the overlap threshold may be modified based on a type of traffic being serviced. For example, time sensitive WLAN traffic may have a greater overlap threshold to increase an overall amount of time used to service WLAN traffic.

The coexistence comparator 430 supplies prediction data, which indicates a predicted TWT service period that does not overlap with a predicted alternate activity period window or a predicted TWT service period that overlaps less than the overlap threshold, to the WLAN service controller 440. The indication, which identifies the predicted TWT service period based on the TWT service, may be a number of TWT service periods between a current TWT service period and the predicted TWT service period. Alternatively, another method of indicating the predicted TWT service may be used in accordance with the teachings described herein.

The WLAN service controller 440 is coupled to the WLAN interface circuitry 120, the WLAN interface monitor 410, the alternate interface monitor 420, and the coexistence comparator 430. The WLAN service controller 440 generates commands based on data from the WLAN interface monitor 410, the alternate interface monitor 420, and the coexistence comparator 430, such as indications of whether traffic needs to be serviced and overlaps between TWT service periods and alternate activity period windows. The WLAN service controller 440 supplies the commands to the WLAN interface circuitry 120. The commands indicate whether the WLAN interface circuitry 120 should resume a TWT service, suspend a TWT service, or renegotiate timing of the TWT service.

The WLAN service controller 440 generates a TWT resume command in response to a determination that the WLAN interface monitor 410 is indicating that there is WLAN traffic to service and the alternate interface monitor 420 is indicating there is no alternate traffic to service. For example, the WLAN service controller 440 generates a TWT resume command in response to the WLAN interface monitor 410 receiving a traffic to service event from the WLAN interface circuitry 120. In such an example, the alternate interface monitor 420 is indicating that there is no alternate traffic to service. The WLAN service controller 440) includes data from the coexistence comparator 430, which specifies a predicted TWT service period to service the WLAN traffic, in the TWT resume command. For example, the WLAN service controller 440) includes a number of TWT service periods between a current TWT service period of the TWT service and a predicted TWT service period determined by the coexistence comparator 430.

The WLAN service controller 440 generates a TWT suspend command in response to a determination that the WLAN interface monitor 410 is indicating that the WLAN traffic to be serviced by a previously generated TWT resume command has been completely serviced. For example, the WLAN service controller 440 generates a TWT suspend command in response to the WLAN interface monitor 410 receiving a servicing traffic complete event from the WLAN interface circuitry 120. The WLAN interface circuitry 120 suspends a TWT service following a TWT suspend command from the WLAN service controller 440.

The WLAN service controller 440 generates a TWT suspend command in response to a determination that the alternate interface monitor 420 is indicating that there is or is predicting alternate traffic to service following a previously generated TWT resume command. For example, the WLAN service controller 440 generates a TWT suspend command in response to the alternate interface monitor 420 receiving a traffic to service event from the alternate interface circuitry 130.

The WLAN service controller 440) generates a TWT resume command in response to a determination that the WLAN interface monitor 410 is indicating that there is or is predicting WLAN traffic to service and the alternate interface monitor 420 is indicating that service of alternate traffic has completed. For example, the WLAN service controller 440 generates a TWT resume command in response to the WLAN interface monitor 410 indicating WLAN traffic to service and the alternate interface monitor 420 receives a servicing traffic complete event from the alternate interface circuitry 130. Such an example occurs following generation of a TWT suspend command before the WLAN interface circuitry 120 generates a servicing traffic complete event.

Advantageously, the WLAN service controller 440) generates commands to suspend a TWT service to allow the alternate interface circuitry 130 to access the shared resources 125 during alternate activity period windows needed to service alternate signaling.

The WLAN service controller 440 generates a TWT renegotiate command in response to a determination that a predicted TWT service period of the TWT service, determined by the coexistence comparator 430, is more than a maximum prediction threshold number of TWT service periods from the current TWT service period. For example, the WLAN service controller 440) generates a TWT renegotiate command in response to the coexistence comparator 430 determining a predicted TWT service period with overlap less than the overlap threshold is more than four TWT service periods from the current TWT service period, when the maximum prediction threshold number is four. Alternatively, the WLAN service controller 440 may generate a TWT renegotiate command in response to a prediction that more than a percentage of TWT service periods comprising a TWT service overlap more than a threshold amount with predicted alternate activity period windows. Advantageously, the coexistence controller circuitry 135 may issue a TWT renegotiate command to prevent a TWT service overlapping with a plurality of alternate activity period windows.

Advantageously, the coexistence controller circuitry 135 orchestrates access to the shared resources by issuing TWT resume, TWT suspend, and TWT renegotiation commands to the WLAN service controller 440. Example operations of the coexistence controller circuitry 135 are discussed below in connection with FIGS. 5A-6 and 10A-10B.

Figure 5A:
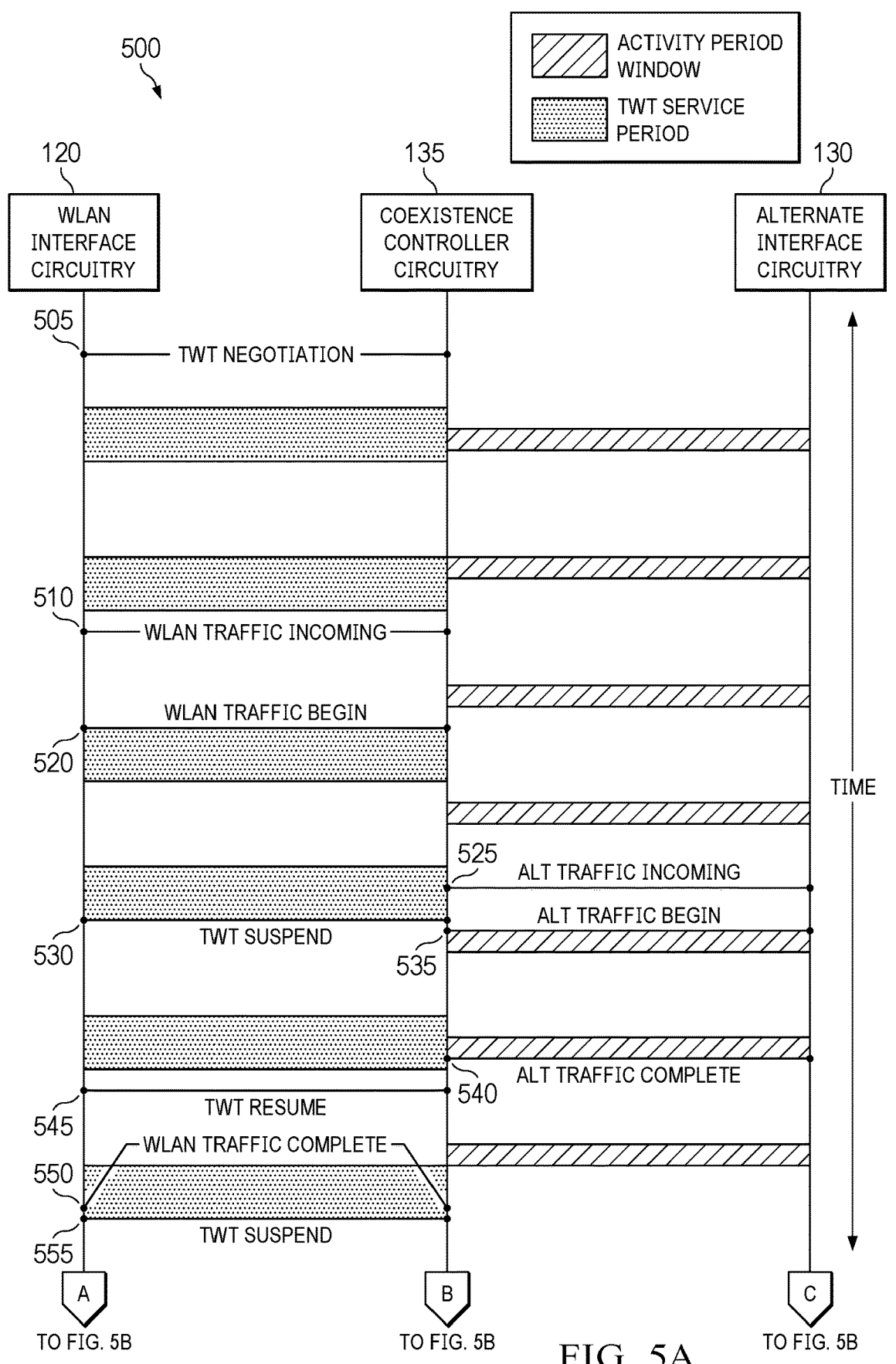
FIGS. 5A and 5B are an example communications diagram of example signaling between the WLAN interface circuitry of FIGS. 1 and 2, the alternate interface circuitry of FIGS. 1 and 3, and the coexistence controller circuitry of FIGS. 1 and 4.

FIG. 5A is an example communications diagram 500 of example signaling of the coexistence controller circuitry 135 of FIGS. 1 and 2, configured to allow the client device 105 of FIG. 1 to orchestrate usage of the shared resources 125 of FIG. 1 between the WLAN interface circuitry 120 of FIG. 1 and the alternate interface circuitry 130 of FIG. 1. In the example of FIG. 5, the communications diagram 500 illustrates example TWT service periods of a TWT service of the WLAN interface circuitry 120, alternate activity period windows of the alternate interface circuitry 130, and example signaling of the coexistence controller circuitry 135 over time. The communications diagram 500 illustrates the interactions of the WLAN interface circuitry 120 and alternate interface circuitry 130 with the coexistence controller circuitry 135.

At a first time 505, the WLAN interface circuitry 120 negotiates timing of a TWT service with the access point 110. Following the first time 505, the WLAN interface circuitry 120 uses established timing of the TWT service to communicate with the access point 110 during nearly periodic TWT service periods.

Between the first time 505 and a traffic event from the WLAN interface circuitry 120, the WLAN interface monitor 410 and the alternate interface monitor 420 determine characteristics of both the TWT service and alternate activity period windows of the alternate interface circuitry 130 using signaling events. Advantageously, the coexistence controller circuitry 135 may use the TWT service events that follow the first time 505 to predict timing of subsequent TWT service.

At a second time 510, the WLAN interface circuitry 120 generates a traffic to service event in response to a determination that there is Wi-Fi traffic which needs to be serviced. For example, the WLAN interface circuitry 120 may generate a traffic to service event when data is supplied to the WLAN data input of the WLAN interface circuitry 120.

Following the second time 510, the coexistence controller circuitry 135 predicts a TWT service period in which the WLAN traffic may be serviced using the shared resources 125. For example, the coexistence comparator 430 uses periods between and durations of both TWT service periods and alternate activity period windows to determine a subsequent TWT service that may use the shared resources 125 without overlap with the alternate interface circuitry 130 usage.

At a third time 520, the WLAN interface circuitry 120 begins to service the WLAN traffic from the second time 510 in response to a start of a TWT service period indicated in the TWT resume command at the second time 510. At the third time 520, the WLAN interface circuitry 120 generates a TWT service period start event, which may be used by the WLAN interface monitor 410 to update and/or verify timing characteristics of the TWT service.

At a fourth time 525, the alternate interface circuitry 130 generates a traffic to service event, which indicates to the coexistence controller circuitry 135 that there is alternate traffic which needs to be serviced. For example, the alternate interface circuitry 130 may generate a traffic to service event when data is supplied to the alternate data input of the alternate interface circuitry 130. In such an example, the alternate interface monitor 420 begins to indicate that there is alternate traffic to service in response to the traffic to service event.

Unlike WLAN traffic, which could be suspended and resumed using commands from the coexistence controller circuitry 135, the alternate traffic is serviced during the following activity period despite whether the WLAN interface circuitry 120 is servicing WLAN traffic using the shared resources 125. In some example implementations, such as implementing BLE signaling with the alternate interface circuitry 130, signaling between the client device 105 and the alternate device 115 may be suspended without additional BLE signaling. Alternatively, the coexistence controller circuitry 135 may be modified in accordance with the teachings disclosed herein to issue TWT suspend and TWT resume commands to the alternate interface circuitry 130.

At a fifth time 530, the coexistence controller circuitry 135 supplies a TWT suspend command to the WLAN interface circuitry 120 in response to a determination that there is alternate traffic to service using the shared resources 125. The TWT suspend command of the fifth time 530 is in response to the traffic to service event from the alternate interface circuitry 130 at the fourth time 525. For example, the WLAN service controller 440 generates a TWT suspend command based on a determination that the alternate interface monitor 420 is indicating that there is alternate traffic to service, while the WLAN interface circuitry 120 is in the process of servicing WLAN traffic. In such an example, the TWT suspend command prevents the WLAN interface circuitry 120 from using the shared resources 125 while the alternate interface circuitry 130 is using the shared resources. Following the fifth time 530, the TWT suspend command causes the WLAN interface circuitry 120 to suspend the TWT service until a predicted TWT service period is specified by a subsequent TWT resume command.

Advantageously, the coexistence controller circuitry 135 suspends access to the shared resources 125 by the WLAN interface circuitry 120 to allow the alternate interface circuitry 130 to service traffic using the shared resources 125. Advantageously, the coexistence controller circuitry 135 uses TWT suspend commands and TWT resume commands to allow the alternate interface circuitry 130 to completely service alternate traffic using one or more alternate activity period windows.

At a sixth time 535, the alternate interface circuitry 130 begins to service the traffic from the fourth time 525. At the sixth time 535, the alternate interface circuitry 130 generates a start alternate activity period window event to indicate the beginning of an alternate activity period window.

At a seventh time 540), the alternate interface circuitry 130 generates a servicing traffic complete event, which indicates to the coexistence controller circuitry 135 that the alternate traffic has completely been serviced. Between the times 535 and 540, the WLAN interface circuitry 120 suspends the TWT service in response to the TWT suspend command at the fifth time 530.

At an eighth time 545, the coexistence controller circuitry 135 supplies a TWT resume command to the WLAN interface circuitry 120. For example, the WLAN service controller 440 generates a TWT resume command in response to the alternate interface monitor 420 indicating that there is no alternate traffic to service. The TWT resume command of the eighth time 545 indicates a predicted TWT service period to continue to service the WLAN traffic from the second time 510. For example, the WLAN service controller 440) includes data to identify the predicted TWT service period determined by the coexistence comparator 430.

At a ninth time 550, the WLAN interface circuitry 120 supplies a serving traffic complete event, which indicates to the coexistence controller circuitry 135 that the WLAN traffic has completely been serviced. Following the ninth time 550, the WLAN interface monitor 410 indicates that there is no WLAN traffic to service.

At a tenth time 555, the coexistence controller circuitry 135 generates a TWT suspend command in response to a servicing traffic complete event at the ninth time 550. For example, the WLAN service controller 440 generates a TWT suspend command based on a determination that the WLAN interface monitor 410 is no longer indicating that there is WLAN traffic to service. Advantageously, the TWT suspend command of the tenth time 555 caused the WLAN interface circuitry 120 to suspend the TWT service until a resume command.

Advantageously, the coexistence controller circuitry 135 generates TWT suspend commands and TWT resume commands to orchestrate operations of the WLAN interface circuitry 120 and the alternate interface circuitry 130 as to allow the shared resources 125 to be shared between a plurality of protocols.

Figure 5B:
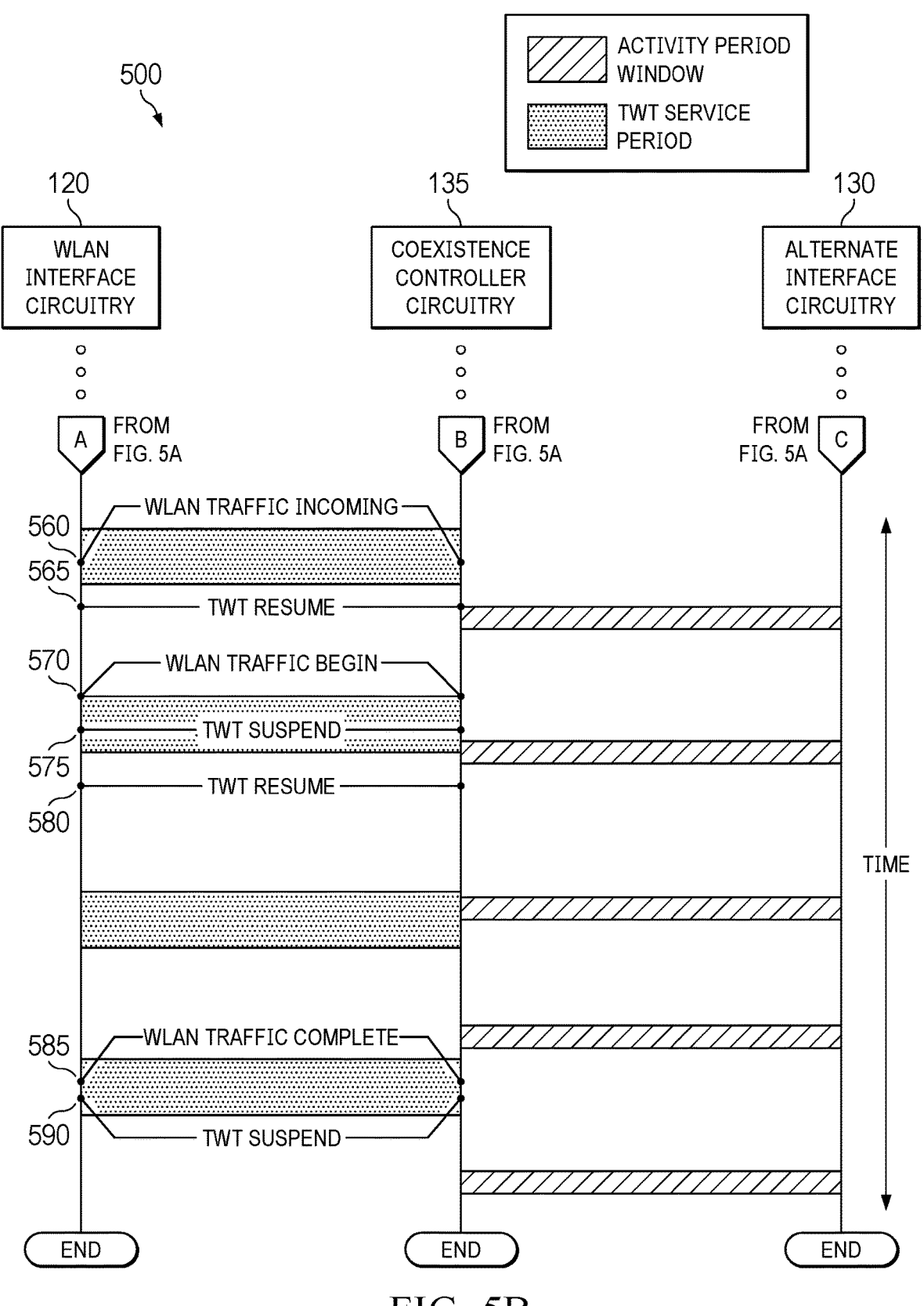

FIG. 5B is a continuation of the communications diagram 500 of FIG. 5A illustrating example operations of the coexistence controller circuitry 135 of FIGS. 1 and 2. In the example of FIG. 5B, the communications diagram 500 illustrates TWT service periods of the established TWT service of the WLAN interface circuitry 120, alternate activity period windows of the alternate interface circuitry 130, and signaling events of the coexistence controller circuitry 135 over time. The communications diagram 500 illustrates the interactions of the interface circuitry 120 and alternate interface circuitry 130 with the coexistence controller circuitry 135.

At an eleventh time 560, the WLAN interface circuitry 120 generates a traffic to service event in response to a determination that there is WLAN traffic which needs to be serviced. The traffic to service event generated at the eleventh time 560 is similar to the traffic to service event generated by the WLAN interface circuitry 120 at the second time 510 of FIG. 5A. Following the eleventh time 560, the coexistence controller circuitry 135 determines a predicted TWT service period in which the WLAN traffic may be serviced using the shared resources 125.

At a twelfth time 565, the coexistence controller circuitry 135 issues a TWT resume command indicating the predicted TWT service period to the WLAN interface circuitry 120. The predicted TWT service period indicated in the TWT resume command of the twelfth time 565 overlaps with an alternate activity period window by an amount of time less than an overlap threshold value. For example, the coexistence comparator 430) identifies a predicted TWT service period where the alternate activity period window overlaps with less than ten percent of the predicted TWT service period. Advantageously, the WLAN interface circuitry 120 may resume the TWT service using the TWT resume command which overlaps with a subsequent alternate activity period window for an amount less than an overlap threshold.

At a thirteenth time 570), the WLAN interface circuitry 120 begins to service the WLAN traffic from the eleventh time 560 in response to a start of the TWT service period event indicated in the TWT resume command at the twelfth time 565. The thirteenth time 570 is similar to the third time 520 of FIG. 5A.

At a fourteenth time 575, the coexistence controller circuitry 135 supplies a TWT suspend command to the WLAN interface circuitry 120 to suspend remaining portions of a TWT service period. The TWT suspend command of the fourteenth time 575 is in response to a determination that an alternate activity period window overlaps with a predicted TWT service period less than the overlap threshold while there is WLAN traffic to service. For example, the WLAN service controller 440 generates a TWT suspend command based on a determination that the WLAN interface monitor 410 is indicating that there is WLAN traffic to service, while there is a predicted TWT service period that overlaps with a predicted alternate activity period windows for less than the overlap threshold. Following the fourteenth time 575, the TWT suspend command causes the WLAN interface circuitry 120 to suspend the TWT service including the remaining portions of a current TWT service period and TWT service periods that occur prior to a TWT service period that is specified by a subsequent TWT resume command.

At a fifteenth time 580, the coexistence controller circuitry 135 supplies a TWT resume command to the WLAN interface circuitry 120 to resume servicing the WLAN traffic from the eleventh time 560. Similar to the eighth time 545 of FIG. 5A, the TWT resume command of the fifteenth time 580 indicates a predicted TWT service period to continue to service the WLAN traffic from the eleventh time 560.

At a sixteenth time 585, the WLAN interface circuitry 120 supplies a serving traffic complete event, which indicates to the coexistence controller circuitry 135 that the WLAN traffic has completely been serviced. Following the sixteenth time 585, the WLAN interface monitor 410 indicates that there is no WLAN traffic to service.

At a seventeenth time 590), the coexistence controller circuitry 135 generates a TWT suspend command in response to a servicing traffic complete event at the sixteenth time 585. Advantageously, the TWT suspend command of the seventeenth time 590 causes the WLAN interface circuitry 120 to suspend the TWT service until a subsequent TWT resume command.

Advantageously, the coexistence controller circuitry 135 may be configured to issue a TWT resume command that indicates a predicted TWT service that overlaps with a predicted alternate activity period window. Advantageously, the coexistence controller circuitry 135 issues a TWT suspend command to prevent the WLAN interface circuitry 120 from accessing the shared resources 125 during a time where the alternate interface circuitry 130 is using the shared resources 125.

Figure 6:
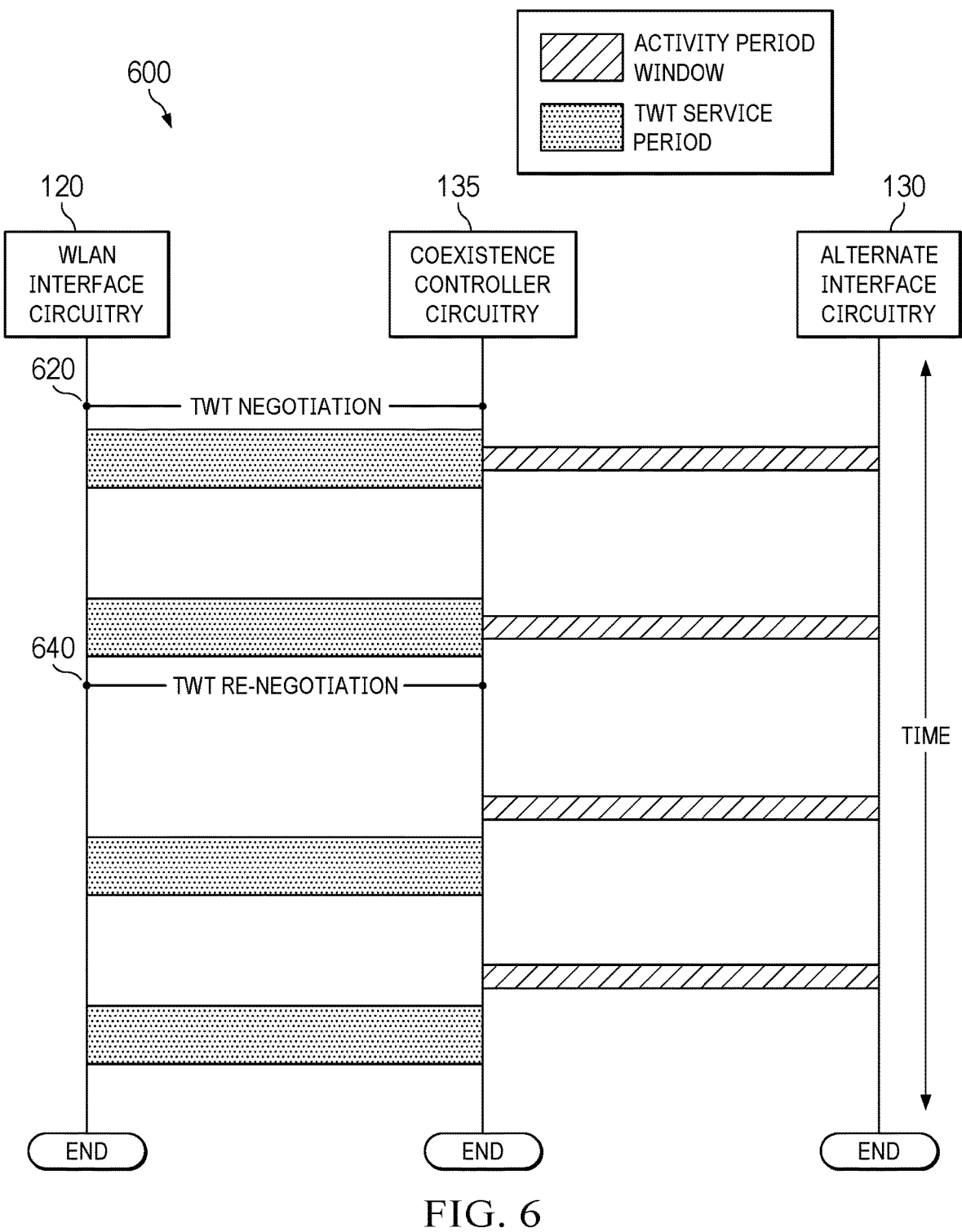
FIG. 6 is an example communications diagram of example signaling between the WLAN interface circuitry of FIGS. 1 and 2, the alternate interface circuitry of FIGS. 1 and 3, and the coexistence controller circuitry of FIGS. 1 and 4 to renegotiate a TWT service.

FIG. 6 is an example communications diagram 600 of example service periods and example TWT signaling of the coexistence controller circuitry 135 of FIGS. 1 and 2 configured to illustrate a TWT renegotiate command determination. In the example of FIG. 6, the coexistence controller circuitry 135 supplies the WLAN interface circuitry 120 of FIG. 1 a TWT renegotiate command based on a determination that a plurality of predicted TWT service period overlap with predicted alternate activity period windows for more than the overlap threshold. The WLAN interface circuitry 120 is configured to renegotiate timing of the TWT service using an offset included in the TWT renegotiate command. The WLAN interface circuitry 120 renegotiates the TWT service with the access point 110 of FIG. 1 in response to a TWT renegotiate command.

At a first time 620, the WLAN interface circuitry 120 negotiates a TWT service with the access point 110. Following the first time 620, the WLAN interface circuitry 120 begins generating start of TWT service period events and end of TWT service period events.

Using the determined characteristics of the TWT service, the coexistence comparator 430 predicts TWT service periods. Using the determined characteristics of the alternate activity period windows, the coexistence comparator 430 predicts alternate activity period windows.

The coexistence comparator 430 compares timing of predicted TWT service periods and predicted alternate activity period windows to determine whether one of the predicted TWT service periods does not overlap with any of the predicted TWT service period. The coexistence comparator 430) continues to predict TWT service periods and predict alternate activity period windows, until either a non-overlapping TWT service period is determined or the next non-overlapping TWT service period is more than a maximum threshold away from a current TWT service period. For example, the coexistence comparator 430 predicts four subsequent TWT service periods of the TWT service when the maximum threshold is four. In such an example, the coexistence comparator 430 may only predict three subsequent TWT service periods when the third predicted TWT service period is determined to overlap with predicted alternate activity period windows less than the overlap threshold. The maximum threshold may be based on a preset value, a duration of time used to service WLAN traffic, the TWT service period, the duration between the TWT service periods, etc.

At a second time 640, the coexistence controller circuitry 135 supplies a TWT renegotiate command to the WLAN interface circuitry 120. For example, between the time 620 and 640) the coexistence comparator 430 predicts a TWT service period that overlaps with an alternate activity period window for less than the overlap threshold is more than the maximum threshold of TWT service periods away from the predicted TWT service period. The TWT renegotiate command of the second time 640 may include an amount of offset which reduces a number of TWT services periods that would overlap with alternate activity period windows. For example, the WLAN service controller 440 may include an amount of time to offset the TWT service by in order to reduce overlaps.

Following the second time 640, the coexistence controller circuitry 135 determines the characteristics of the TWT service to predict TWT service periods using renegotiated timing of the TWT service. Advantageously, the coexistence controller circuitry 135 may generate a TWT renegotiate command to prevent a plurality of subsequent TWT service periods from overlapping with subsequent activity periods.

While an example manner of implementing the client device 105 of FIG. 1 is illustrated in FIGS. 2-4, one or more of the elements, processes, and/or devices illustrated in FIGS. 2-4 may be combined, divided, re-arranged, omitted, eliminated, and/or implemented in any other way. Further, the WLAN interface circuitry 120 of FIGS. 1 and 2, the alternate interface circuitry 130 of FIGS. 1 and 3, the coexistence controller circuitry 135 of FIGS. 1 and 4, and/or, more generally, the example client device 105 of FIG. 1, may be implemented by hardware alone or by hardware in combination with software and/or firmware. Thus, for example, any of the WLAN interface circuitry 120, the alternate interface circuitry 130, the coexistence controller circuitry 135, and/or, more generally, the example client device 105, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example client device 105 of FIG. 1 may include one or more elements, processes, and/or devices in addition to, or instead of, those illustrated in FIGS. 2-4, and/or may include more than one of any or all of the illustrated elements, processes and devices.

A flowchart representative of example machine readable instructions, which may be executed to configure processor circuitry to implement the WLAN interface circuitry 120 of FIGS. 1 and 2, the alternate interface circuitry 130 of FIGS. 1 and 3, and/or the coexistence controller circuitry 135 of FIGS. 1 and 4, are shown in FIGS. 7-10. The machine readable instructions may be one or more executable programs or portion(s) of an executable program for execution by processor circuitry, such as the processor circuitry 1112 shown in the example processor platform 1100 discussed below in connection with FIG. 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM). FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware.

The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 7-10, many other methods of implementing the example client device 105 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7-10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C. (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A. (2) at least one B, or (3) at least one A and at least one B.

Figure 7:
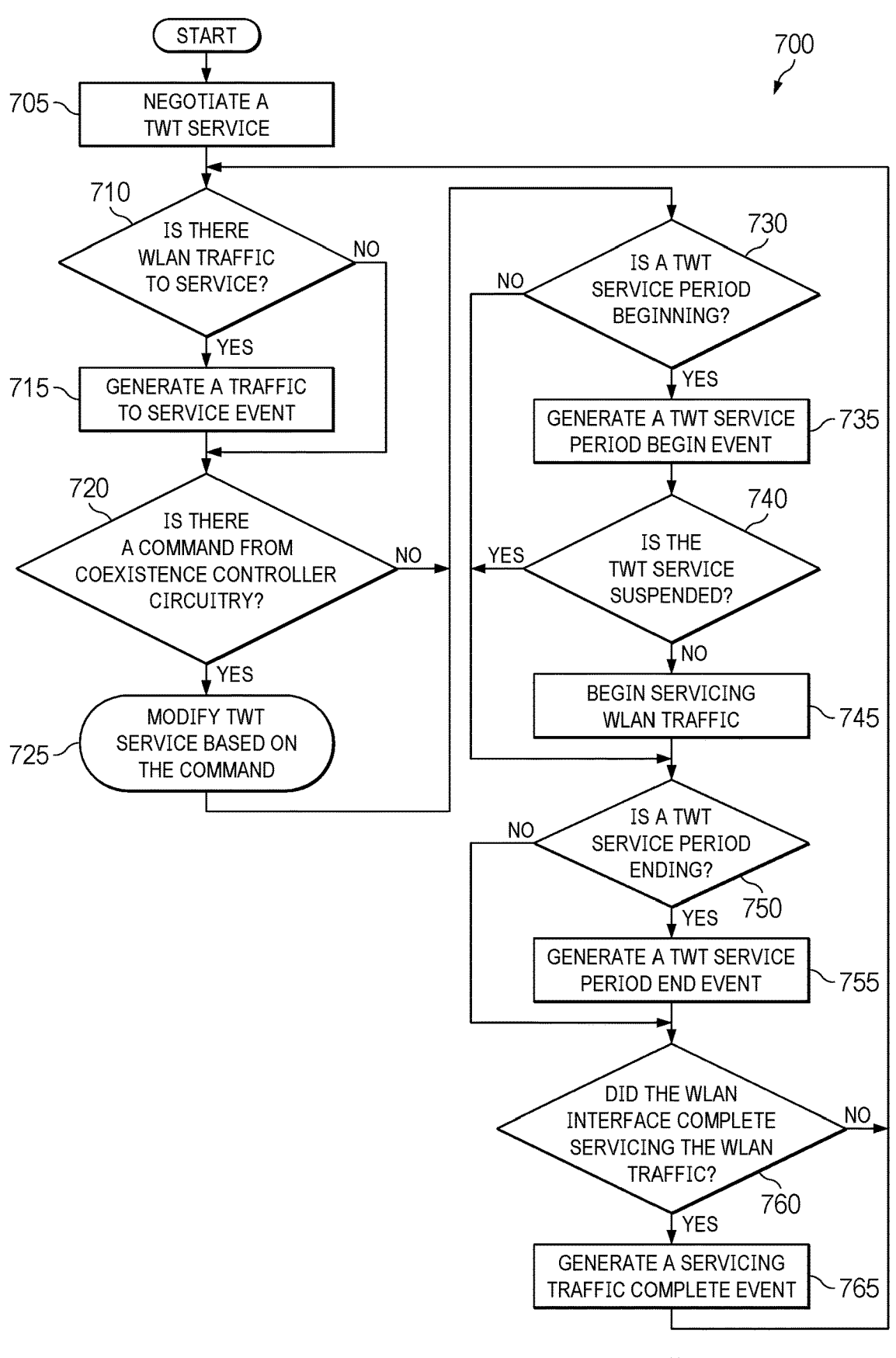
FIG. 7 is a flowchart representative of an example process that may be performed using machine readable instructions that can be executed and/or hardware configured to implement the WLAN interface circuitry of FIGS. 1 and 2.

FIG. 7 is a flowchart representative of an example process 700 that may be performed using machine readable instructions that can be executed and/or hardware configured to implement the WLAN interface circuitry 120 of FIGS. 1 and 2. The process 700 begins at block 705. At block 705, the WLAN interface circuitry 120 negotiates a TWT service. For example, the WLAN traffic manager 210 of FIG. 2 communicates with the access point 110 of FIG. 1 to establish the TWT service. The process 700 proceeds to block 710.

At block 710, the WLAN interface circuitry 120 determines whether there is WLAN traffic to service. For example, the WLAN traffic manager 210 determines whether there is any WLAN traffic to send to and/or receive from the access point 110. The process 700 proceeds to block 715 upon determining that there is WLAN traffic to service. The process 700 proceeds to block 720 upon determining that all WLAN traffic has been serviced.

At block 715, the WLAN interface circuitry 120 generates a traffic to service event. For example, the WLAN event generator 230 of FIG. 2 generates a traffic to service event in response to a determination that the WLAN traffic manager 210 is indicating WLAN traffic to service. The process 700 proceeds to block 720.

At block 720, the WLAN interface circuitry 120 determines whether there is a command from the coexistence controller circuitry 135 of FIG. 1. For example, the command manager 240) of FIG. 2 may receive a command from the coexistence controller circuitry 135. The process 700 proceeds to block 725 if the command manager 240 has received a command from the coexistence controller circuitry 135. The process 700 proceeds to block 730 if the command manager 240) has not received a command from the coexistence controller circuitry 135.

At block 725, the WLAN interface circuitry 120 modifies the TWT service based on the command received from the coexistence controller circuitry 135. For example, the command manager 240) may cause the TWT service generator 220 of FIG. 2 to suspend the TWT service following a TWT service specified in a TWT resume command from the coexistence controller circuitry 135. The possible operations to modify TWT service are discussed in further detail in connection with FIG. 8, below. The process 700 proceeds to block 730.

At block 730, the WLAN interface circuitry 120 determines if a TWT service period is beginning. For example, the WLAN event generator 230 determines whether a TWT service period is beginning by detecting a rising edge on an output of the TWT service generator 220. The process 700 proceeds to block 735 if the WLAN interface circuitry 120 determines that a TWT service period is beginning. The process 700 proceeds to block 750 if the WLAN interface circuitry 120 determines that a TWT service period is not beginning.

At block 735, the WLAN interface circuitry 120 generates a TWT service period begin event. For example, the WLAN event generator 230 generates a start of a TWT service period event. The process 700 proceeds to block 740.

At block 740, the WLAN interface circuitry 120 determines if the TWT service period is suspended. For example, the WLAN traffic manager 210 determines whether a TWT service is suspended based on the TWT service generator 220. The process 700 proceeds to block 745 if the WLAN interface circuitry 120 determines the TWT service is suspended. The process 700 proceeds to block 750 if the WLAN interface circuitry 120 determines that the TWT service from the block 730 is not suspended.

At block 745, the WLAN interface circuitry 120 begins servicing the WLAN traffic from the block 710. For example, the WLAN traffic manager 210 uses the shared resources 125 to transmit and/or receive WLAN commands. The process 700 proceeds to block 750.

At block 750, the WLAN interface circuitry 120 determines whether a TWT service period is ending. For example, the WLAN event generator 230 determines a TWT service period is ending by a falling edge of the TWT service generated by the TWT service generator 220. The process 700 proceeds to block 755 if the WLAN interface circuitry 120 determines that a TWT service period is ending. The process 700 proceeds to block 760 if the WLAN interface circuitry 120 determines a TWT service period is not ending.

At block 755, the WLAN interface circuitry 120 generates a TWT service period end event. For example, the WLAN event generator 230 generates an end of a TWT service period event to represent an end of a TWT service period. The process 700 proceeds to block 760.

At block 760, the WLAN interface circuitry 120 determines whether the WLAN traffic has been completely serviced. For example, the WLAN event generator 230 determines whether the traffic indicator of the WLAN traffic manager 210 is indicating that there is still WLAN traffic to service. The process 700 proceeds to block 710 upon determining that WLAN traffic was not completely serviced. The process 700 proceeds to block 765 in response to determining that the WLAN traffic was completely serviced at the block 745.

At block 765, the WLAN interface circuitry 120 generates a servicing traffic complete event. For example, the WLAN event generator 230 generates a servicing traffic complete event in response to an indication from the WLAN traffic manager 210. The process 700 proceeds to block 710.

Although example methods are described with reference to the flowchart illustrated in FIG. 7, many other methods of generating events based on operations of the WLAN interface circuitry 120 may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 8:
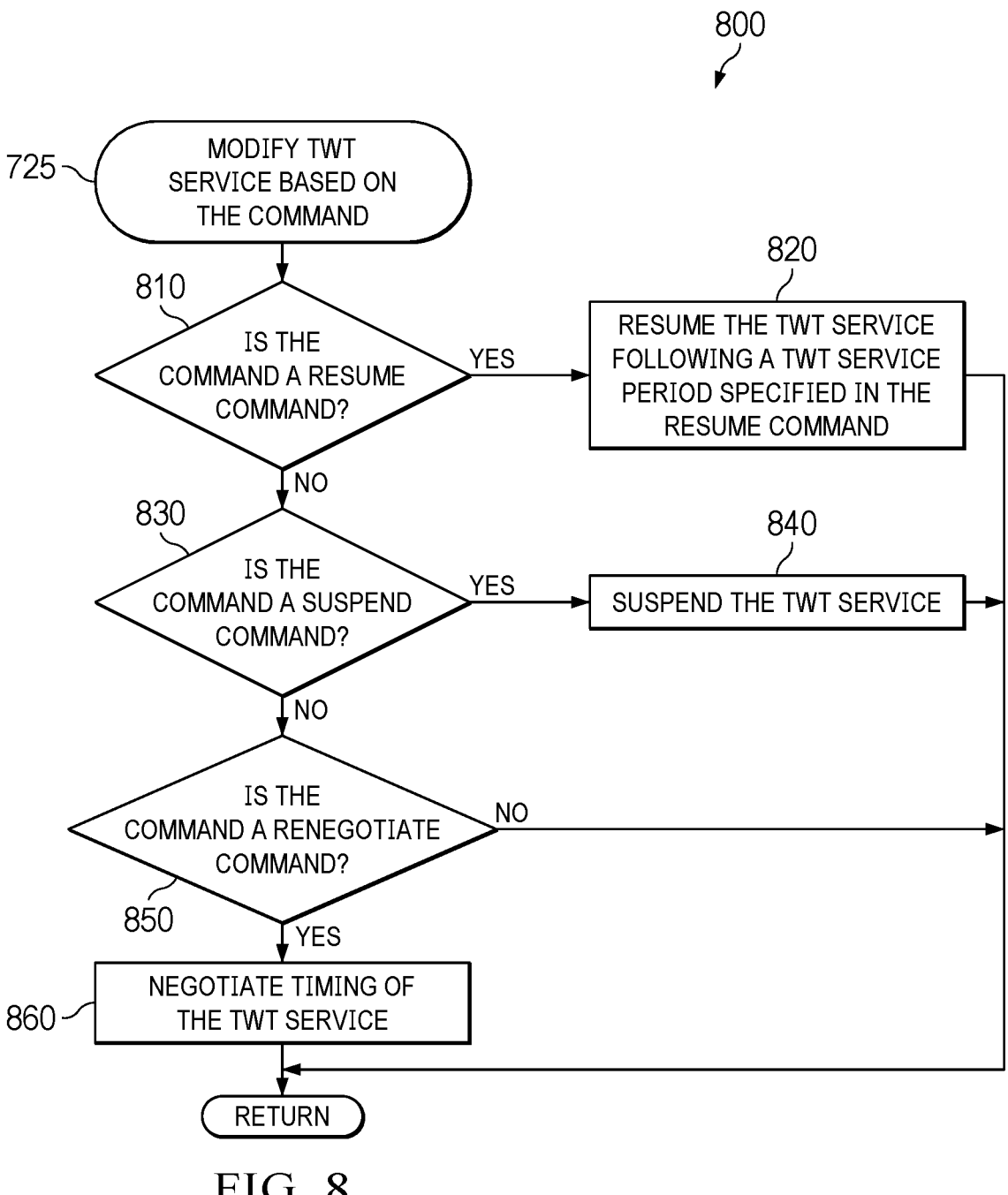
FIG. 8 is a flowchart representative of an example process that may be performed using machine readable instructions that can be executed and/or hardware configured to implement the WLAN interface circuitry of FIGS. 1 and 2 to modify service periods based on commands from the coexistence controller of FIGS. 1 and 4.

FIG. 8 is a flowchart representative of an example process 800 of the block 725 of FIG. 7 that may be performed using machine readable instructions that can be executed and/or hardware configured to implement the WLAN interface circuitry 120 of FIGS. 1 and 2 to modify service periods based on a command from the coexistence controller circuitry 135 of FIGS. 1 and 4. The process 800 begins at block 810. At block 810, the WLAN interface circuitry 120 determines whether the command is a resume command. For example, the command manager 240) may determine that a command from the coexistence controller circuitry 135 is a TWT resume command. The process 800 proceeds to block 820 in response to determining that the command is a resume command. The process 800 proceeds to block 830 in response to determining that the command is not a resume command.

At block 820, the WLAN interface circuitry 120 resumes the TWT service following a TWT service period specified in the resume command. For example, the command manager 240) indicates to the TWT service generator 220 of FIG. 2 which predicted TWT service period to resume the TWT service prior to. In such an example, the TWT service generator 220 resumes TWT service following the predicted TWT service period until the command manager 240) receives a TWT suspend command. The process 800 proceeds to return to the block 730) of FIG. 7.

At block 830, the WLAN interface circuitry 120 determines if the command is a TWT suspend command. For example, the command manager 240) may determines that a command from the coexistence controller circuitry 135 is a TWT suspend command. The process 800 proceeds to block 840 in response to determining that the command is a TWT suspend command. The process 800 proceeds to block 850 in response to determining that the command is not a TWT suspend command.

At block 840, the WLAN interface circuitry 120 suspends the TWT service. For example, the TWT service generator 220 suspends the TWT service. In such an example, the TWT service generator 220 may suspend a portion of a current TWT service period to prevent overlap between the current TWT service period and an alternate activity window. The process 800 proceeds to return to block 730.

At block 850, the WLAN interface circuitry 120 determines if the command is a renegotiate command. For example, the command manager 240) may determines that a command from the coexistence controller circuitry 135 is a TWT renegotiate command. The process 800 proceeds to block 860 in response to determining that the command is a TWT renegotiate command. The process 800 proceeds to return to block 730 in response to determining that the command is not a TWT renegotiate command.

At block 860, the WLAN interface circuitry 120 negotiates timing of the TWT service. For example, the TWT service generator 220 indicates a renegotiation is needed to the WLAN traffic manager 210 of FIG. 2 to initiate a renegotiation of the TWT service. In such an example, the WLAN traffic manager 210 renegotiates the TWT service using an amount of offset that reduces overlap between TWT service and alternate activity period windows. The process 800 proceeds to return to block 730.

Although example methods are described with reference to the flowchart illustrated in FIG. 8, many other methods of modifying operations of the WLAN interface circuitry 120 based on commands from the coexistence controller circuitry 135 may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 9:
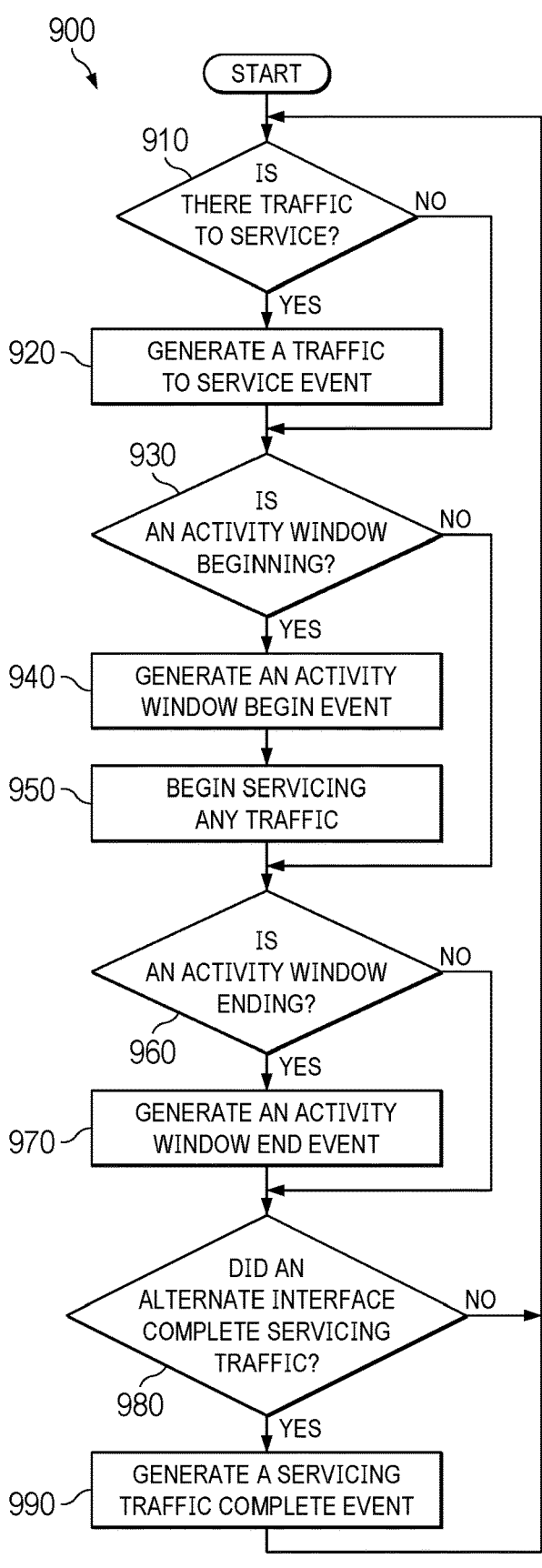
FIG. 9 is a flowchart representative of an example process that may be performed using machine readable instructions that can be executed and/or hardware configured to implement the alternate interface circuitry of FIGS. 1 and 3.

FIG. 9 is a flowchart representative of an example process 900 that may be performed using machine readable instructions that can be executed and/or hardware configured to implement the alternate interface circuitry 130 of FIGS. 1 and 3. The process 900 begins at block 910. At block 910, the alternate interface circuitry 130 determines whether there is alternate traffic to service. For example, the alternate traffic manager 310) determines whether there are any commands to send to and/or receive from the alternate device 115 of FIG. 1. The process 900 to block 920 upon determining that there is alternate traffic to service. The process 900 to block 930 upon determining that all alternate traffic has been serviced.

At block 920, the alternate interface circuitry 130 generates a traffic to service event. For example, the alternate event generator 330 of FIG. 3 generates a traffic to service event in response to the traffic indicator of the alternate traffic manager 310 indicating there is or predicts alternate traffic to service. The process 900 proceeds to block 930.

At block 930, the alternate interface circuitry 130 determines if an activity window is beginning. For example, the alternate event generator 330) determines whether an alternate activity period window is beginning by determining a rising edge on an output of the activity window generator 320 of FIG. 3. The process 900 proceeds to block 940 in response to the alternate interface circuitry 130 determining that an activity window is beginning. The process 900 proceeds to block 960 if the alternate interface circuitry 130 determines that an activity window is not beginning.

At block 940, the alternate interface circuitry 130 generates an activity window begin event. For example, the alternate event generator 330 generates a start of an alternate activity period window event. The process 900 proceeds to block 950.

At block 950, the alternate interface circuitry 130 begins servicing the alternate traffic from the block 910. For example, the alternate traffic manager 310 uses the shared resources 125 of FIG. 1 to transmit and/or receive commands. The process 900 proceeds to block 960.

At block 960, the alternate interface circuitry 130 determines whether an activity window is ending. For example, the alternate event generator 330 determines an alternate activity period window is ending by determining a falling edge of the alternate activity period window generated by the activity window generator 320 of FIG. 3. The process 900 proceeds to block 970 in response to the alternate interface circuitry 130 determining that an alternate activity period window is ending. The process 900 proceeds to block 980 if the alternate interface circuitry 130 determines an alternate activity period window is not ending.

At block 970, the alternate interface circuitry 130 generates an activity window end event. For example, the alternate event generator 330 generates an end of an alternate activity period window event to represent an end of an alternate activity period window. The process 900 proceeds to block 980.

At block 980, the alternate interface circuitry 130 determines whether the alternate traffic has been completely serviced. For example, the alternate event generator 330 determines whether the traffic indicator of the alternate traffic manager 310 is indicating that there is still alternate traffic to service. The process 900 proceeds to block 910 upon determining that alternate traffic was not completely serviced. The process 900 proceeds to block 990 in response to determining that the alternate traffic was completely serviced at the block 950.

At block 990, the alternate interface circuitry 130 generate a servicing traffic complete event. For example, the alternate event generator 330 generates a servicing traffic complete event based on the alternate traffic manager 310. The process 900 proceeds to block 910.

Although example methods are described with reference to the flowchart illustrated in FIG. 7, many other methods of generating events based on operations of the alternate interface circuitry 130 may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

FIGS. 10A and 10B are flowcharts representative of an example process 1000 that may be performed using machine readable instructions that can be executed and/or hardware configured to implement the coexistence controller circuitry 135 of FIGS. 1 and 4 to generate commands to control the WLAN interface circuitry 120 of FIGS. 1 and 2. The process 1000 begins at block 1005. At block 1005, the coexistence controller circuitry 135 initializes WLAN interface monitoring and alternate interface monitoring. For example, the WLAN interface monitor 410 of FIG. 4 and the alternate interface monitor 420 of FIG. 4 begin to receive events from the WLAN interface circuitry 120 of FIGS. 1 and 2 and the alternate interface circuitry 130 of FIGS. 1 and 3. The process 1000 proceeds to block 1010.

At block 1010, the coexistence controller circuitry 135 determines characteristics of a TWT service. For example, the WLAN interface monitor 410 determines a number of clock cycles or time between a first start of a TWT service period event and an end of a TWT service period event as a TWT service period of the TWT service. In such an example, the WLAN interface monitor 410) determines a number of clock cycles or time between the end of the TWT service period event and a second start of a TWT service period event as the duration between TWT service periods. The process 1000 proceeds to block 1015.

At block 1015, the coexistence controller circuitry 135 determines a characteristics of activity windows. For example, the alternate interface monitor 420 determines a number of clock cycles or time between a first start of an alternate activity period window event and an end of an alternate activity period window event as the period of an alternate activity period window. In such an example, the alternate interface monitor 420 determines a number of clock cycles or time between the end of an alternate activity period window event and a second start of an alternate activity period window event from the block 1005 as the duration between alternate activity period windows. The process 1000 proceeds to block 1020.

At block 1020, the coexistence controller circuitry 135 determines if there is an event from the alternate interface circuitry 130. For example, the alternate interface monitor 420 may receive a start of an alternate activity period window event, an end of an alternate activity period window event, a traffic to service event, and/or a servicing traffic complete event from the alternate interface circuitry 130. The process 1000 proceeds to block 1025 in response to determining that an event was received from the alternate interface circuitry 130. The process 1000 proceeds to block 1030 in response to determining that no event was received from the alternate interface circuitry 130.

At block 1025, the coexistence controller circuitry 135 updates the alternate interface monitor 420 based on the event at the block 1020. For example, the alternate interface monitor 420) updates a traffic to service indication to indicate that there is traffic to service following a traffic to service event. In such an example, the alternate interface monitor 420 updates the traffic to service indication to indicate that there is no traffic to service following a servicing traffic complete event. Additional examples of updating the coexistence controller circuitry 135 based on events from the alternate interface circuitry 130 are described in connection with FIG. 4, above. The process 1000 proceeds to block 1030.

At block 1030, the coexistence controller circuitry 135 determines if there is an event from the WLAN interface circuitry 120. For example, the WLAN interface monitor 410 may receive a start of a TWT service period event, an end of a TWT service period event, a traffic to service event, and/or a servicing traffic complete event from the WLAN interface circuitry 120. The process 1000 proceeds to block 1035 in response to determining that an event was received from the WLAN interface circuitry 120. The process 1000 proceeds to block 1040 in response to determining that no event was received from the WLAN interface circuitry 120.

At block 1035, the coexistence controller circuitry 135 updates the WLAN interface monitor 410 based on the event at the block 1020. For example, the WLAN interface monitor 410 updates a traffic to service indication to indicate that there is traffic to service following a traffic to service event. In such an example, the WLAN interface monitor 410 updates the traffic to service indication to indicate that there is no traffic to service following a servicing traffic complete event. Additional examples of updating the coexistence controller circuitry 135 based on events from the WLAN interface circuitry 120 are described in connection with FIG. 4, above. The process 1000 proceeds to block 1040.

At block 1040, the coexistence controller circuitry 135 determines if there is a subsequent TWT service with overlap less than an overlap threshold. For example, the coexistence comparator 430 of FIG. 4 uses the period of and duration between TWT service periods and alternate activity period windows to predict TWT service periods and predict alternate activity period windows. In such an example, the coexistence comparator 430 compares the predicted TWT service periods to the predicted alternate activity period windows to predict a TWT service period that overlaps with an alternate activity period window for a time less than an overlap threshold of ten percent of a TWT service period.

The coexistence controller circuitry 135 may be configured to attempt to predict TWT service periods within a service period threshold number of TWT service periods from the current TWT service period. The process 1000 proceeds to block 1045 in response to determining that no subsequent TWT service overlaps less than the overlap threshold. The process 1000 proceeds to block 1050 in response to determining a subsequent TWT service with overlap less than the overlap threshold.

At block 1045, the coexistence controller circuitry 135 generates a renegotiation command including an offset. For example, the WLAN service controller 440 of FIG. 4 generates a TWT renegotiate command including an amount of time to offset the TWT service to reduce overlap between TWT service and alternate activity period windows. In such an example, the offset may be determined by the coexistence comparator 430 based on characteristics of the TWT service and/or alternate activity period windows. The process 1000 proceeds to block 1005.

At block 1050, the coexistence controller circuitry 135 determines if there is WLAN traffic to service. For example, the WLAN service controller 440 determines whether there is WLAN traffic to service based on a traffic indication from the WLAN interface monitor 410. The process 1000 proceeds to block 1055 in response to a determination that there is WLAN traffic to service. The process 1000 proceeds to block 1060 in response to a determination that there is no Wi-Fi traffic to service.

At block 1055, the coexistence controller circuitry 135 generates a resume command specifying the subsequent TWT service period from block 1040. For example, the WLAN service controller 440 generates a TWT resume command including a number of TWT service periods between a current TWT service period and a predicted TWT service period determined by the coexistence comparator 430. The process proceeds to block 1060.

At block 1060, the coexistence controller circuitry 135 determines if there is overlap between an alternate activity period window and the subsequent TWT service from block 1040. For example, the coexistence comparator 430 determining a subsequent TWT service to overlap with a subsequent alternate activity period window by an amount less than the overlap threshold and greater than no overlap. The process 1000 proceeds to block 1065 in response to a determination that the subsequent TWT service period overlaps with a subsequent TWT service period. The process 1000 proceeds to block 1070 in response to a determination that the subsequent TWT service does not overlap with a subsequent activity window.

At block 1065, the coexistence controller circuitry 135 generates a suspend command during the subsequent TWT service from blocks 1040 and 1055. For example, the WLAN service controller 440 generates a TWT suspend command to suspend the TWT service prior to a start of an alternate activity period window that overlaps with the TWT service. The process 1000 proceeds to block 1010.

At block 1070, the coexistence controller circuitry 135 determines if there is alternate traffic to service following the subsequent TWT service period from blocks 1040 and 1055. For example, the WLAN service controller 440 determines that the alternate interface monitor 420 receives a traffic to service event following a start of a TWT service period event of the predicted TWT service period, specified in a previous resume command. The process 1000 proceeds to block 1075 in response to a determination that there is alternate traffic to service following the subsequent TWT service period from blocks 1040 and 1055. The process 1000 proceeds to block 1080 in response to a determination that there is no alternate traffic to service following the subsequent TWT service period from blocks 1040 and 1055.

At block 1075, the coexistence controller circuitry 135 generates a suspend command before the alternate traffic, from block 1070, begins to be serviced. For example, the WLAN service controller 440 generates a TWT suspend command at an end of a TWT service period immediately prior to an alternate activity period window which will be used to service alternate traffic. The process proceeds to block 1010.

At block 1080, the coexistence controller circuitry 135 determines if the WLAN traffic, from block 1050, has been completely serviced. For example, the WLAN service controller 440) determines that WLAN traffic has been completely serviced following the WLAN interface monitor 410 receiving a servicing traffic complete event. The process 1000 proceeds to block 1085 in response to a determination that the WLAN traffic, from block 1050, has been completely serviced. The process 1000 proceeds to block 1010 in response to a determination that the WLAN traffic, from block 1050, has not been completely serviced.

At block 1085, the coexistence controller circuitry 135 generates a suspend command. For example, the WLAN service controller 440 generates a TWT suspend command to suspend the TWT service. The process proceeds to block 1010.

Although example methods are described with reference to the flowchart illustrated in FIG. 10, many other methods of generating command to modify the WLAN interface circuitry 120 may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 11:
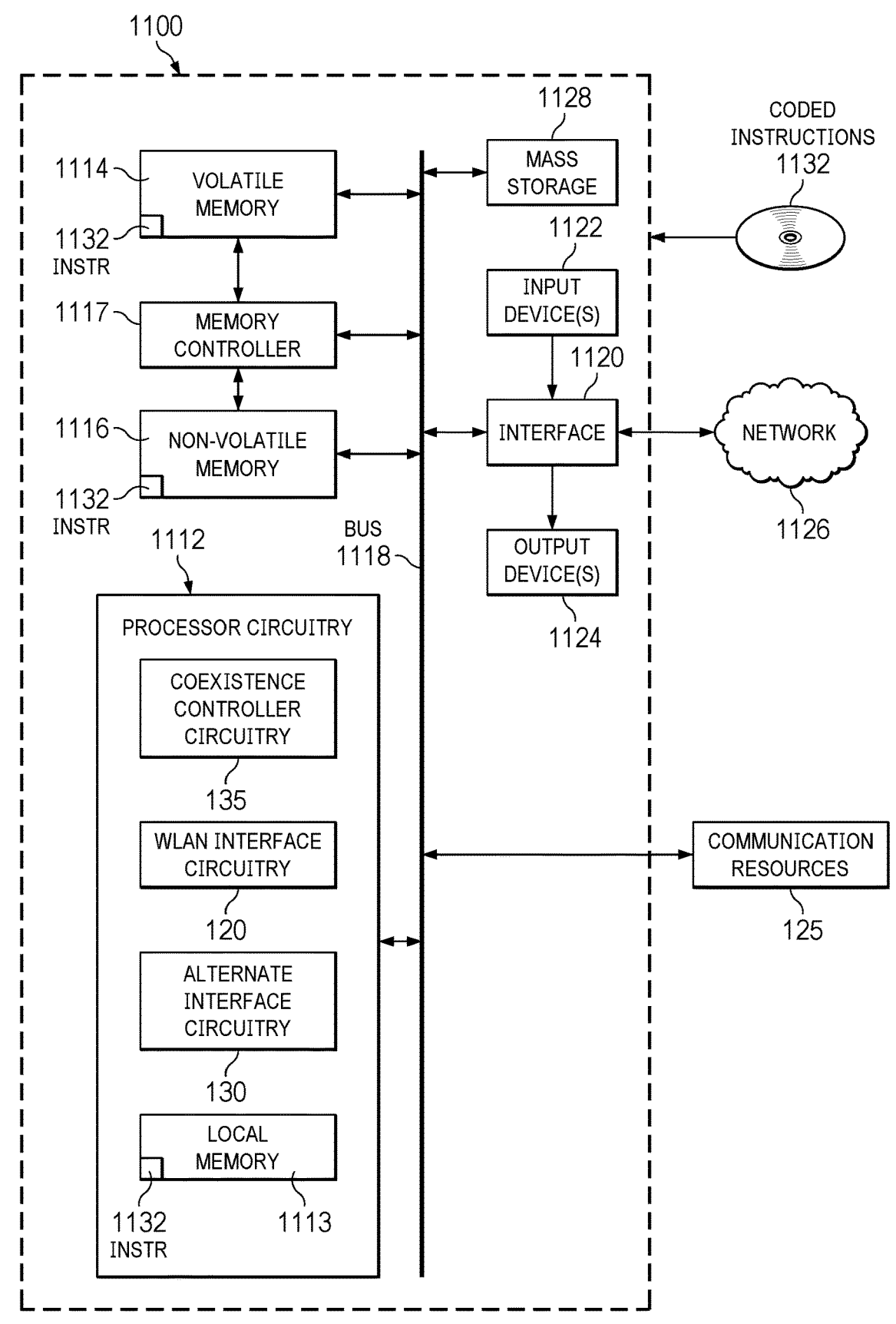
FIG. 11 is a block diagram of an example processing platform including processor circuitry structured to execute the example machine readable instructions and/or the example operations of FIGS. 7-10 to implement the client device of FIG. 1.

FIG. 11 is a block diagram of an example processor platform 1100 structured to execute and/or instantiate the machine readable instructions and/or the operations of FIGS. 7-10 to implement the client device 105 of FIG. 1. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the WLAN interface circuitry 120 of FIGS. 1 and 2, the alternate interface circuitry 130 of FIGS. 1 and 3, and the coexistence controller circuitry 135 of FIGS. 1 and 4.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth R interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1132, which may be implemented by the machine readable instructions of FIGS. 7-10, may be stored in the mass storage device 1128, in the volatile memory 1114, in the non-volatile memory 1116, and/or on a removable non-transitory computer readable storage medium such as a CD or DVD.

In this description, the term "and/or" (when used in a form such as A, B and/or C) refers to any combination or subset of A, B, C, such as: (a) A alone; (b) B alone; (c) C alone; (d)

A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Modifications are possible in the described embodiments, and other embodiments are possible, within the scope of the claims.

What is claimed is:

1. An apparatus comprising:
   first interface circuitry;
   second interface circuitry; and
   coexistence controller circuitry coupled to the first interface circuitry and the second interface circuitry, the coexistence controller circuitry including:
      a first interface monitor coupled to the first interface circuitry, the first interface monitor configurable to determine characteristics of a target wakeup time (TWT) service of the first interface circuitry;
      a second interface monitor coupled to the second interface circuitry, the second interface monitor configurable to determine characteristics of an activity period window of the second interface circuitry;
      a coexistence comparator coupled to the first interface monitor and the second interface monitor, the coexistence comparator configurable to determine a TWT service period of the TWT service that overlaps an alternate activity period window for less than a threshold; and
      a service controller coupled to the first interface circuitry, the first interface monitor, the second interface monitor, and the coexistence comparator, the service controller configurable to generate commands to modify operations of the first interface circuitry, wherein the commands include suspend commands that suspend the operations of the first interface circuitry.

2. The apparatus of claim 1, wherein the first interface circuitry is configurable to communicate with an access point using an IEEE 802.11 TWT signaling standard.

3. The apparatus of claim 1, wherein a physical resource or a logical resource is shared between the first interface circuitry and the second interface circuitry, the physical resource is one or more of an antenna, a radio frequency front end, a modem, or air accesses circuitry, the logical resource is one or more of an operation frequency or an operation bandwidth.

4. The apparatus of claim 1, wherein the coexistence comparator is further configurable to determine a plurality of activity period windows of the second interface circuitry using the characteristics of the activity period window from the second interface monitor.

5. The apparatus of claim 1, wherein the second interface monitor is further configurable to receive a complete event, for a corresponding service traffic event, from the second interface circuitry and wherein the service controller is further configurable to generate a resume command that resumes the operations of the first interface circuitry in response to the complete event.

6. The apparatus of claim 1, wherein the TWT service period is a first TWT service period, the service controller is configurable to generate a suspend command based on a determination that a second TWT service period, following the first TWT service period, overlaps with the activity period window for more than the threshold.

7. The apparatus of claim 6, the service controller is configurable to generate a resume command following the suspend command based on a determination that a third TWT service period overlaps with the activity period window for less than the threshold.

8. The apparatus of claim 1, wherein the threshold is based on a priority of traffic to service, the priority of traffic representing a type of traffic or whether traffic is time sensitive.

9. At least one non-transitory machine-readable storage medium comprising instructions that, when executed, cause at least one processor to at least:
   determine properties of a target wakeup time (TWT) service of a first protocol, the TWT service including TWT service periods which represent times that first interface circuitry may use a resource;
   determine properties of activity period windows of a second protocol, the activity period windows represent times that second interface circuitry may use the resource;
   identify a first TWT service period of the TWT service that overlaps with a first activity period window of the activity period windows for a time less than a threshold;
   supply a resume command to the first interface circuitry before the first TWT service period; and
   supply a suspend command to the first interface circuitry in response to a determination that a second TWT service period, following the first TWT service period, overlaps with a second activity period window for a time greater than the threshold, a completion of wireless local area network (WLAN) traffic, or a service traffic event for the second interface circuitry.

10. The at least one non-transitory machine-readable storage medium of claim 9, wherein the instructions, when executed, cause the at least one processor to determine to modify the properties of the TWT service to reduce overlapping of the TWT service and the activity period windows.

11. The at least one non-transitory machine-readable storage medium of claim 9, wherein the instructions, when executed, cause the at least one processor to service WLAN traffic on the first interface circuitry using a plurality of service periods of one or more instances of the TWT service based on the activity period windows of the second interface circuitry.

12. The at least one non-transitory machine-readable storage medium of claim 9, wherein the instructions, when executed, cause the at least one processor to suspend the TWT service following the resume command and prior to the second TWT service period.

13. The at least one non-transitory machine-readable storage medium of claim 9, wherein the instructions, when executed, cause the at least one processor to resume the first TWT service period in response to the resume command.

14. The at least one non-transitory machine-readable storage medium of claim 9, wherein the instructions, when executed, cause the at least one processor to prevent the first interface circuitry from accessing the resource following the suspend command and prior to a resume command.

15. The at least one non-transitory machine-readable storage medium of claim 9, wherein the instructions, when executed, cause the at least one processor to communicate using the first interface circuitry that implements an IEEE 802.11 signaling communication standard.

16. A method comprising:

determining, by a wireless local area network (WLAN) interface monitor, characteristics of a target wakeup time (TWT) service of a first WLAN protocol, the TWT service including TWT service periods that represent times that a WLAN interface circuitry may use a shared resource;

determining, by an alternate interface monitor, activity period windows of a second protocol, the activity period windows represent times that alternate interface circuitry may use the shared resource;

determining, by a coexistence comparator, overlap of the TWT service periods and the activity period windows;

identifying, by the coexistence comparator, a first TWT service period that overlaps with the activity period windows for a time less than a threshold;

supplying, by a service controller, a resume command to the WLAN interface circuitry before the first TWT service period; and supplying, by the service controller, a suspend command to the WLAN interface circuitry in response to determining that a second TWT service period, following the first TWT service period, overlaps with the activity period windows for a time greater than the threshold, a completion of WLAN traffic, or receiving an indication of a service traffic event from the alternative interface monitor.

17. The method of claim 16, further comprising servicing WLAN traffic on the WLAN interface circuitry using a plurality of periods of the TWT service based on the activity period windows of the alternate interface circuitry.

18. The method of claim 16, further comprising:

suspending TWT service periods following the resume command and prior to the first TWT service period; and resuming prior to the first TWT service period.

19. The method of claim 16, further comprising preventing the WLAN interface circuitry from accessing the shared resource following the suspend command and prior to a resume command.

20. The method of claim 16, further comprising:

receiving, by the alternate interface monitor, a complete event for the service traffic event from the alternate interface circuitry; and generating, by the service controller, a second resume command for the WLAN interface circuitry following the suspend command, wherein the service controller generates the second resume command in response to receiving a second indication of the complete event from the alternate interface monitor.

21. The method of claim 16, further comprising communicating using the WLAN interface circuitry that implements an IEEE 802.11 signaling communication standard.

22. The method of claim 16, further comprising supplying a renegotiate command to the WLAN interface circuitry in response to determining that a plurality of subsequent TWT service periods overlap with the activity period windows.

* * * * *